United States Patent
Itoh et al.

(10) Patent No.: US 11,459,463 B2
(45) Date of Patent: Oct. 4, 2022

(54) METHOD FOR FORMING MULTILAYER COATING FILM

(71) Applicant: KANSAI PAINT CO., LTD., Hyogo (JP)

(72) Inventors: Masayuki Itoh, Aichi (JP); Hirokazu Okazaki, Kanagawa (JP); Hisashi Isaka, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 84 days.

(21) Appl. No.: 16/349,744

(22) PCT Filed: Nov. 17, 2017

(86) PCT No.: PCT/JP2017/041464
§ 371 (c)(1),
(2) Date: May 14, 2019

(87) PCT Pub. No.: WO2018/092878
PCT Pub. Date: May 24, 2018

(65) Prior Publication Data
US 2020/0071533 A1    Mar. 5, 2020

(30) Foreign Application Priority Data
Nov. 18, 2016 (JP) .............................. JP2016-225115

(51) Int. Cl.
| | | |
|---|---|---|
| *C09C 1/00* | (2006.01) | |
| *B05D 1/38* | (2006.01) | |
| *B05D 5/06* | (2006.01) | |
| *B05D 7/14* | (2006.01) | |
| *B05D 7/24* | (2006.01) | |
| *C09D 5/36* | (2006.01) | |
| *B05D 7/00* | (2006.01) | |
| *B05D 3/02* | (2006.01) | |

(52) U.S. Cl.
CPC .............. *C09C 1/0015* (2013.01); *B05D 1/38* (2013.01); *B05D 5/067* (2013.01); *B05D 7/14* (2013.01); *B05D 7/24* (2013.01); *C09D 5/36* (2013.01); *B05D 3/02* (2013.01); *B05D 5/068* (2013.01); *B05D 7/50* (2013.01); *B05D 7/56* (2013.01); *B05D 7/577* (2013.01); *C09C 2200/102* (2013.01)

(58) Field of Classification Search
CPC ... B05D 1/38; B05D 3/02; B05D 5/06; B05D 5/067; B05D 5/068; B05D 7/24; B05D 7/50; B05D 7/56; B05D 7/577
USPC ................................................... 427/407.1
See application file for complete search history.

(56) References Cited

U.S. PATENT DOCUMENTS

| | | | | |
|---|---|---|---|---|
| 4,755,435 A | * | 7/1988 | Fujii ...................... | B05D 7/576 |
| | | | | 204/486 |
| 5,242,716 A | * | 9/1993 | Iwase ...................... | B05D 7/16 |
| | | | | 427/327 |
| 5,326,596 A | * | 7/1994 | Kasari ................... | B05D 7/577 |
| | | | | 204/488 |
| 5,718,950 A | * | 2/1998 | Komatsu ................ | B05D 5/065 |
| | | | | 427/405 |
| 5,731,089 A | * | 3/1998 | Kunikiyo ............... | B05D 7/577 |
| | | | | 427/388.4 |
| 6,180,181 B1 | * | 1/2001 | Verardi .................. | B05D 7/572 |
| | | | | 427/409 |
| 6,248,225 B1 | * | 6/2001 | Palaika .................. | C25D 15/00 |
| | | | | 204/484 |
| 2002/0082341 A1 | * | 6/2002 | Matsuno ............. | C08L 2666/16 |
| | | | | 524/589 |
| 2007/0128369 A1 | * | 6/2007 | Fujieda .................. | B05D 7/572 |
| | | | | 427/384 |
| 2009/0087675 A1 | | 4/2009 | Tonomura et al. | |
| 2013/0089731 A1 | | 4/2013 | Imanaka et al. | |
| 2015/0368484 A1 | | 12/2015 | Shishaku et al. | |
| 2018/0214912 A1 | | 8/2018 | Itoh et al. | |
| 2019/0001370 A1 | | 1/2019 | Itoh et al. | |

FOREIGN PATENT DOCUMENTS

| | | | |
|---|---|---|---|
| CA | 3 030 637 | | 1/2018 |
| CN | 101283063 | | 10/2008 |
| CN | 102959019 | | 3/2013 |
| EP | 3 441 436 | | 2/2019 |
| JP | 8/164358 | | 6/1996 |
| JP | 2002-273335 | | 9/2002 |
| JP | 2011-45805 | | 3/2011 |
| JP | 2012-157827 | | 8/2012 |
| JP | 2014-004552 | * | 1/2014 |
| JP | 2014-4552 | | 1/2014 |

(Continued)

OTHER PUBLICATIONS

International Search Report dated Feb. 13, 2018 in International Application No. PCT/JP2017/041464.

(Continued)

*Primary Examiner* — Brian K Talbot
(74) *Attorney, Agent, or Firm* — Wenderoth, Lind & Ponack, L.L.P.

(57) ABSTRACT

Provided is a method for forming a multilayer coating film, comprising simultaneously curing an uncured base coating film, an uncured effect coating film, and an uncured clear coating film. In this method, an effect pigment dispersion (Y) contains water, a rheology control agent (A), and a flake-effect pigment (B), and has a solids content of 0.5 to 10 mass %; the flake-effect pigment (B) is an interference pigment in which a transparent or translucent base material is coated with a metal oxide; and the flake-effect pigment (B) is contained in an amount of 30 to 90 parts by mass based on 100 parts by mass of the total solids content in the effect pigment dispersion (Y).

7 Claims, No Drawings

(56) References Cited

FOREIGN PATENT DOCUMENTS

| | | | |
|---|---|---|---|
| JP | 2015-51385 | | 3/2015 |
| JP | 2015-86303 | | 5/2015 |
| JP | 2015-107448 | | 6/2015 |
| JP | 2016-77998 | | 5/2016 |
| JP | 2016-87569 | | 5/2016 |
| JP | 5939695 | * | 6/2016 |
| WO | 2014/119781 | | 8/2014 |
| WO | 2017/022698 | | 2/2017 |
| WO | 2017/111112 | | 6/2017 |
| WO | 2017/135426 | | 8/2017 |
| WO | 2017/175468 | | 10/2017 |
| WO | 2018/012014 | | 1/2018 |

OTHER PUBLICATIONS

Shichang, M. "Electrodeposition coating", Chemical Dictionary, 1999, 6 total pages, with Machine Translation and cited in CC.
"New Products/Technology", Information of Paper Making, 2016, No. 4, pp. 45-46, with Machine translation and Cited in CC.
Office Action issued Jun. 24, 2021 in corresponding Chinese Patent Application No. 201780071601.3, with Machine Translation.
Notice of Reasons for Refusal dated Aug. 17, 2021 in corresponding Japanese Patent Application No. 2018-551702, with Machine Translation.

* cited by examiner

METHOD FOR FORMING MULTILAYER COATING FILM

TECHNICAL FIELD

The present invention relates to a method for forming a multilayer coating film.

BACKGROUND ART

The purpose of applying paints is mainly to protect materials and impart an excellent appearance. For industrial products, excellent appearance, particularly "texture," is important in terms of enhancing their product power. Although there are various textures for industrial products desired by consumers, luster like pearl (hereinafter referred to as "pearl luster") has recently been desired in the field of automobile exterior panels, automobile components, home electronics, and the like.

Pearl luster is a texture with strong multiple reflection light of irradiated light, and with low graininess.

PTL 1 discloses a method for forming a multilayer coating film, comprising sequentially forming a colored base coating film, a white-pearlescent or silver-pearlescent base coating film, and a clear coating film; wherein the colored base coating film contains a titanium white pigment and an aluminum flake and adjusted to N7 to N9 of the Munsell color chart, and the white-pearlescent or silver-pearlescent base coating film contains a flaky mica powder coated with titanium oxide. A coating film with pearl luster is obtained due to the effect of the flaky mica powder in the white-pearlescent or silver-pearlescent base coating layer. However, graininess appears depending on the orientation of the flaky mica powder in the coating film; thus, pearl luster is insufficient.

PTL 2 discloses a method for forming a pearly luster coating film, comprising forming a color base coating film layer on a substrate, forming an interference clear coating layer containing an interference pigment on the color base coating film layer, and further forming thereon a matte top clear coating layer containing chromatic tinting resin fine particles having a color akin to the interference color of the interference pigment as a matting agent. Pearl luster is developed in such a manner that a matte coating film is formed as the uppermost layer. However, luster is insufficient because light is scattered in the matte coating film.

PTL 3 discloses a method for forming a coating film that allows formation of a coating film having high whiteness and an excellent minute feeling, and that changes gently and calmly in luminosity from highlight (near specular reflection light) to shade (in the oblique direction). This method is a method for forming a coating film by sequentially forming a color base coating film having a luminosity L* in the L*a*b* color space of 75 to 90, a metallic base coating film containing four kinds of interference pigments having different interference colors in highlight, and a top clear coating film. Fine and white pearl paint color is obtained because several types of interference pigments having different interference colors are contained. However, when the titanium oxide-coated alumina flake pigment disclosed in the Examples is used, graininess may become strong, and pearl luster may be insufficient.

Moreover, PTL 1 to PTL 3 do not describe the anti-water adhesion of the coating films.

CITATION LIST

Patent Literature

PTL 1: JPH08-164358A
PTL 2 JP2002-273335A
PTL 3: JP2011-45805A

SUMMARY OF INVENTION

Technical Problem

An object of the present invention is to provide a method for forming a multilayer coating film, whereby a coating film having excellent pearl luster and anti-water adhesion can be formed.

Solution to Problem

In order to achieve the above object, the present invention includes the main subjects shown in the following items.

Item 1. A method for forming a multilayer coating film by sequentially performing the following steps (1) to (5):
(1) applying a colored paint (W) to a substrate, followed by heating, to forma colored coating film,
(2) applying a base paint (X) to the colored coating film formed in step (1) to form a base coating film,
(3) applying an effect pigment dispersion (Y) to the base coating film formed in step to faun an effect coating film,
(4) applying a clear paint (Z) to the effect coating film formed in step (3) to form a clear coating film, and
(5) heating the uncured base coating film, the uncured effect coating film, and the uncured clear coating film formed in steps (2) to (4) to thereby simultaneously cure these three coating films;
wherein the effect pigment dispersion (Y) contains water, a rheology control agent (A), and a flake-effect pigment (B), and has a solids content of 0.5 to 10 mass %,
the flake-effect pigment (B) is an interference pigment in which a transparent or translucent base material is coated with a metal oxide, and
the flake-effect pigment (B) is contained in an amount of 30 to 90 parts by mass based on 100 parts by mass of the total solids content in the effect pigment dispersion, Item 2. The method for forming a multilayer coating film according to Item 1, wherein the effect coating film has a dry film thickness of 0.2 to 5 μm.

Item 3. The method for forming a multilayer coating film according to Item 1 or 2, wherein the multilayer coating film obtained in step (5) has a Y value (Y5) of 400 to 1000 and an HG value of 20 to 65, wherein the Y valve expresses luminance in the XYZ color space based on the spectral reflectance of light illuminated at an angle of 45 degrees with respect to the coating film and received at an angle of 5 degrees deviated from the specular reflection light in the incident light direction, and the HG value expresses microscopic brilliance.

Item 4. The method, for forming a multi layer coating film according to any one of Items 1 to 3, wherein the base coating film is a transparent coating film or a colored coating film.

Item 5. The method for forming a multilayer coating film according to any one of Items 1 to 4, wherein the colored coating film obtained in step (1) has an L* value of 60 or more.

Item 6. The method for forming a multilayer coating film according to any one of Items 1 to 5, wherein the rheology control agent (A) is a cellulose nanofiber.

Item 7. The method for forming a multilayer coating film according to any one of Items 1 to 6, wherein the effect pigment dispersion (Y) further contains a surface adjusting agent (C).

Item 8. The method for forming a multilayer coating film according to any one of Items 1 to 7, wherein the clear paint (Z) is a two-component clear paint containing a hydroxy containing resin and a polyisocyanate compound.

Advantageous Effects of Invention

According to the method for forming a multilayer coating film of the present invention, a coating film having excellent pearl luster and anti-water adhesion is obtained.

DESCRIPTION OF EMBODIMENTS

The method for forming a multilayer coating film of the present invention is described in more detail below.

1. Step (1)

Step (1) is to apply a colored paint (W) to a substrate, followed by heating, to form a colored coating film.

Substrate

The substrate to which the method of the present invention can be applied is not particularly limited. Examples include exterior panels of vehicle bodies, such as automobiles, trucks, motorcycles, and buses; automobile components exterior panels of home appliances, such as mobile phones and audio equipment. Among these, vehicle body exterior panels and automobile components are preferable.

The base materials that constitute these substrates are not particularly limited. Examples include metal plates, such as iron plates, aluminum plates, brass plates, copper plates, stainless steel plates, tin plates, galvanized steel plates, and alloyed zinc (Zn—Al, Zn—Ni, Zn—Fe or the like)-plated steel plates; resins, such as polyethylene resin, polypropylene resin, acrylonitrile-butadiene-styrene (ABS) resin, polyimide resin, acrylic resin, vinylidene chloride resin, polycarbonate resin, polyurethane resin, and epoxy resin; plastic materials, such as various FRPs; inorganic materials, such as glass, cement, and concrete; wood; fibrous materials (paper, cloth or the like); and the like. Among these, metal plates or plastic materials are preferable. Further, these materials can be subjected to degreasing treatment or surface treatment, if necessary, to thereby form base materials, Moreover, the above substrate may be one in which an undercoating film and/or an intermediate coating film is formed on a base material mentioned above. When the base material is made of metal, chemical conversion treatment using phosphate, chromate, or the like is preferably performed before an undercoating film is formed.

The undercoating film is formed for the purpose of imparting, for example, anticorrosion, antirust, adhesion to the base material, and masking properties for the unevenness of the base material surface. As undercoating paints for forming such undercoating films, those that are themselves known can be used. For example, cationic or anionic electrodeposition paints are preferably applied to conductive base materials, such as metals. Chlorinated polyolefin resin-based paints are preferably applied to low-polarity base materials, such as polypropylene.

After the application, the undercoating paint may be cured by heating, blowing, or like means, or may be dried to an extent not causing curing. When a cationic or anionic electrodeposition paint is used as the undercoating paint, the undercoating paint is preferably cured by heating after applying the undercoating paint so as to prevent the formation of a mixed layer between the undercoating film and a coating film sequentially formed on the undercoating film, and to form a multilayer coating film of excellent appearance. The above base material surface and undercoating film are also called "undercoating."

The intermediate coating film is formed to conceal the undercoating, to improve the adhesion between the undercoating and the top coating film, and to impart chipping resistance to the coating film. The intermediate coating film can be formed by applying an intermediate paint to the undercoating surface, followed by curing. The number of intermediate coating films may be one or two or more, and each layer may be cured or uncured.

The intermediate paint is not particularly limited, and known intermediate paints can be used. It is preferable to use, for example, organic-solvent-based or aqueous-based intermediate paints comprising a thermosetting resin composition and a coloring pigment.

In the method of the present invention, when a member in which an undercoating film and/or an intermediate coating film is formed is used as a base material, a paint of the subsequent step can be applied after the undercoating film and/or the intermediate coating film is cured beforehand by heating. However, in some cases, paint of the subsequent step can be applied while the undercoating film and/or the intermediate coating film is in an uncured state.

Colored Paint (W)

The colored paint (W) is used to ensure surface smoothness of the coating film, and to strengthen coating film properties, such as impact resistance and chipping resistance. The "chipping resistance" mentioned herein is tolerance to damage to coating films caused by collision of obstructions, such as small stones.

The colored paint (W) used in this step is preferably a thermosetting paint that is commonly used in this field, and that contains a base resin, a curing agent, and a medium comprising water and/or an organic solvent.

As the base resin and the curing agent, known compounds commonly used in this field can be used. Examples of the base resin include acrylic resins, polyester resins, epoxy resins, polyurethane resins, and the like. Examples of the curing agent include amino resins, polyisocyanate compounds, blocked polyisocyanate compounds, and the like. Usable examples of the organic solvent include methanol, ethanol, n-propyl alcohol, isopropyl alcohol, ethylene glycol, and the like.

In addition to the above components, the colored paint (W) used in the method of the present invention may suitably contain, if necessary, an ultraviolet absorber, an antifoaming agent, a thickener, a rust inhibitor, a surface adjusting agent, a pigment, or the like.

Examples of the pigment include coloring pigments, extender pigments, effect pigments, and the like. These can be used singly or in a combination of two or more.

Examples of the coloring pigments include titanium oxide, zinc flower, carbon black, molybdenum red, Prussian blue, cobalt blue, azo pigments, phthalocyanine pigments, quinacridone pigments, isoindoline pigments, threne pigments, perylene pigments, dioxazine pigments, diketopyrrolopyrrole pigments, and the like. Among these, titanium oxide and carbon black can be preferably used.

Examples of the extender pigments include clay, kaolin, barium sulfate, barium carbonate, calcium carbonate, talc, silica, alumina white, and the like. Among these, barium sulfate and/or talc are preferably used. In particular, it is preferable to use barium sulfate with an average primary particle size of 1 μm or less, and more preferably 0.01 to 0.8 μm, as the extender pigment to provide a multilayer coating film of appearance with excellent smoothness.

In the present specification, the average primary particle size of barium sulfate is determined by observing barium sulfate using a scanning electron microscope and averaging the maximum diameter of 20 barium sulfate particles on a straight line drawn at random on the electron microscope photograph.

Moreover, examples of the effect pigments include aluminum (including vapor-deposited aluminum), copper, zinc, brass, nickel, aluminum oxide, mica, titanium oxide- or iron oxide-coated aluminum oxide, titanium oxide- or iron oxide-coated mica, glass flakes, and holographic pigments. These effect pigments can be used singly or in a combination of two or more. Examples of aluminum pigments include non-leafing aluminum pigments and leafing aluminum pigments. Any of these pigments can be used.

When the colored paint (W) contains a pigment, the content of the pigment is generally within the range of 1 to 500 parts by mass, preferably 3 to 400 parts by mass, and more preferably 5 to 300 parts by mass, based on 100 parts by mass of the total resin solids content in the colored paint (W). In particular, it is preferable that the colored paint (W) contains a coloring pigment and/or an extender pigment, and that the total content of the coloring pigment and the extender pigment is generally within the range of 1 to 500 parts by mass, preferably 3 to 400 parts by mass, and particularly preferably 5 to 300 parts by mass, based on 100 parts by mass of the total resin solids content in the colored paint (W).

When the colored paint (W) contains a coloring pigment mentioned above, the content of the coloring pigment is generally within the range of 1 to 300 parts by mass, preferably 3 to 250 parts by mass, and more preferably 5 to 200 parts by mass, based on 100 parts by mass of the total resin solids content in the colored paint (W).

When the colored paint (W) contains an extender pigment mentioned above, the content of the extender pigment is generally within the range of 1 to 300 parts by mass, preferably 5 to 250 parts by mass, and even more preferably 10 to 200 parts by mass, based on 100 parts by mass of the total resin solids content in the colored paint (W).

When the colored paint (W) contains an effect pigment mentioned above, the content of the effect pigment is generally within the range of 0.1 to 50 parts by mass, preferably 0.2 to 30 parts by mass, and more preferably 0.3 to 20 parts by mass, based on 100 parts by mass of the total resin solids content in the colored paint (W).

Coating of the colored paint (W) having the above structure can improve the surface smoothness, impact resistance, and chipping resistance of the coated article.

As the coating method of the colored paint (W), general coating methods commonly used in this field can be used. Examples of the coating method include coating methods using a brush or a coating device. Among these, a coating method using a coating device is preferable. Preferable examples of the coating device include an airless spray coating device, an air spray coating device, and a rotary atomization electrostatic coating device, such as a paint cassette coating device; a rotary atomization electrostatic coating device is particularly preferable.

The number of colored coating films mentioned above may be one or two or more, and each layer may be cured or uncured.

The colored coating film formed in this step is a dried coating film obtained by applying the colored paint (W), followed by heating for curing, in terms of preventing the formation of a mixed layer between the colored coating film and a base coating film formed in step (2) described later. When heating of the colored paint (W) is insufficient, pearl luster is impaired.

In this case, the heating temperature is preferably within the range of 110 to 180° C., and particularly preferably 120 to 160° C. Moreover, the heat treatment time is preferably within the range of 10 to 60 minutes, and particularly preferably 15 to 40 minutes.

The cured film thickness of the colored coating film after heat treatment under the above conditions is preferably within the range of 10 to 50 μm, and particularly preferably 15 to 40 μm, in terms of the impact resistance and chipping resistance of the coating film.

In the colored paint (W), the color difference between a coating film with a reference film thickness of T μm and a coating film with 1.2 T μm (i.e., $\Delta E^*(T-1.2T)$), and the color difference between a coating film with a reference film thickness of T μm and a coating film with 0.8 T μm (i.e., $\Delta E^*(T-0.8T)$), are each preferably 1 or less, and more preferably 0.8 or less, in terms of the color stability of the multilayer coating film to be obtained. The reference film thickness T μm can be any numerical value selected from 10 to 50 μm as the cured film thickness.

The L* value of the colored coating film obtained in step (1) is preferably 60 or more, more preferably 70 or more, and even more preferably 80 or more, in terms of obtaining a multilayer coating film with excellent pearl luster.

When the colored coating film obtained in step (1) has coating film defect portions, such as dirt, seed, and orange peel, these can be removed. These coating defect portions can be removed by grinding the coating film with abrasive paper or an abrasive cloth by hand or using an instrument (sander) to which abrasive paper or an abrasive cloth is attached.

Specifically, for example, the coating defect portions are first ground and removed using abrasive paper or an abrasive cloth containing a polishing material with a relatively rough particle size of about #400 to 600, and the ground surface is then made smooth using abrasive paper or an abrasive cloth containing a polishing material with a fine particle size of about #1000 to 1500. This is preferable to make the finished appearance of the multilayer coating film excellent. In order to remove powder of the coating film generated by grinding, it is preferable to wipe the coating surface with an organic solvent, such as gasoline, and to simultaneously perform degreasing. Grinding can be performed in the "spot range," that is, only in the above coating defect portions and neighboring portions thereof in the colored coating film; alternatively, the entire colored coating film can also be polished. Moreover, the grinding depth can be suitably selected according to the size, degree, or the like of dirt and seed, and is generally within 50 μm, and particularly preferably about 10 to 30 μm.

2. Step (2)

Step (2) is to apply a base paint (X) to the colored coating film formed in step (1) to form a base coating film. In the present invention, the base paint (X) is an essential component for the multilayer coating film to exhibit undercoat hiding power.

Base Paint (X)

As the base paint, a known paint composition can be used. In particular, a paint composition generally used for coating of vehicle bodies is suitably used as the base paint.

The base paint (X) is preferably a paint containing a base resin, a curing agent, and a medium comprising water and/or an organic solvent. As the base resin and the curing agent, known compounds commonly used in this field can be used.

The base resin is preferably a resin that has excellent weather resistance, transparency, and the like. Specific examples include acrylic resins, polyester resins, epoxy resins, urethane resins, and the like.

Examples of acrylic resins include resins obtained by copolymerizing monomer components, such as α,β-ethylenically unsaturated carboxylic acids, (meth)acrylic acid esters having a functional group, such as a hydroxyl group, an amide group, or a methylol group, other (meth)acrylic-acid esters, and styrene.

Examples of polyester resins include those obtained by the condensation reaction of polybasic acid, polyhydric alcohol, or denatured oil by a conventional method.

Examples of epoxy resins include an epoxy resin obtained by a method in which an epoxy ester is synthesized by the reaction of an epoxy group and an unsaturated fatty acid, and an α,β-unsaturated acid is added to this unsaturated group; an epoxy resin obtained by a method in which the hydroxyl group of epoxy ester and a polybasic acid, such as phthalic acid or trimellitic acid, are esterified; and the like.

Examples of urethane resins include urethane resins obtained by reacting at least one diisocyanate compound selected from the group consisting of an aliphatic diisocyanate compound, an alicyclic diisocyanate compound, and an aromatic diisocyanate compound, with at least one polyol compound selected from the group consisting of polyether polyol, polyester polyol, and polycarbonate polyol; urethane resins whose molecular weight is increased by reacting an acrylic resin, a polyester resin, or an epoxy resin mentioned above with a dipolyisocyanate compound; and the like.

The base paint (X) may be an aqueous paint or a solvent-based paint. However, in terms of reducing the VOC of the paint, the colored paint (X) is preferably an aqueous paint. When the base paint (X) is an aqueous paint, the base resin can be made soluble in water or dispersed in water by using a resin containing a hydrophilic group, such as a carboxyl group, a hydroxyl group, a methylol group, an amino group, a sulfonic acid group, or a polyoxyethylene group, most preferably a carboxyl group, in an amount sufficient for making the resin soluble in water or dispersed in water, and neutralizing the hydrophilic group to form an alkali salt. The amount of the hydrophilic group (e.g., a carboxyl group) used in this case is not particularly limited, and can be suitably selected depending on the degree of water solubilization or water dispersion. However, the amount of the hydrophilic group is generally such that the acid value is about 10 mgKOH/g or more, and preferably 30 to 200 mgKOH/g. Examples of the alkaline substance used in neutralization include sodium hydroxide, amine compounds, and the like.

Moreover, dispersion of the above resin in water can be performed by emulsion polymerization of the monomer components in the presence of a surfactant and optionally a water-soluble resin. Furthermore, the water dispersion can also be obtained by, for example, dispersing the above resin in water in the presence of an emulsifier. In the water dispersion, the base resin may not contain the above hydrophilic group at all, or may contain the above hydrophilic group in an amount less than the water-soluble resin.

The curing agent is used to crosslink and cure the base resin by heating. Examples include amino resins, polyisocyanate compounds (including unblocked polyisocyanate compounds and blocked polyisocyanate compounds), epoxy-containing compounds, carboxy-containing compounds, carbodiimide group-containing compounds, hydrazide group-containing compounds, semicarbazide group-containing compounds, and the like. Preferable among these are amino resins reactive with a hydroxyl group, polyisocyanate compounds, and carbodiimide group-containing compounds reactive with a carboxyl group. These curing agents can be used singly or in a combination of two or more.

Specifically, amino resins obtained by condensation or co-condensation of formaldehyde with melamine, benzoguanamine, urea, or the like, or further etherification with a lower monohydric alcohol, are suitably used. Further, a polyisocyanate compound can also be suitably used.

The ratio of each component in the base paint (X) may be freely selected as required. However, in terms of water resistance, finish, and the like, it is generally preferable that the ratio of the base resin is 50 to 90 mass %, and particularly 60 to 85 mass %, based on the total mass of both components; and that the ratio of the curing agent is 10 to 50 mass %, and particularly 15 to 40 mass %, based on the total mass of both components.

An organic solvent can also be used for the base paint (X), if necessary. Specifically, organic solvents generally used for paints can be used. Examples of organic solvents include hydrocarbons, such as toluene, xylene, hexane, and heptane; esters, such as ethyl acetate, butyl acetate, ethylene glycol monomethyl ether acetate, diethylene glycol monoethyl ether acetate, and diethylene glycol monobutyl acetate; ethers, such as ethylene glycol monomethyl ether, ethylene glycol diethyl ether, diethylene glycol monomethyl, ether, and diethylene glycol dibutyl ether; alcohols, such as butanol, propanol, octanol, cyclohexanol, and diethylene glycol; ketones, such as methyl ethyl ketone, methyl isobutyl ketone, cyclohexanone, and isophorone; and other organic solvents. These can be used singly or in a combination of two or more.

In addition to the above components, the base paint (X) may suitably contain a coloring pigment, an extender pigment, an ultraviolet absorber, an antifoaming agent, a rheology control agent, a rust inhibitor, a surface adjusting agent, or the like, if necessary.

The base paint (X) is preferably a clear paint or a colored paint.

The base paint (X) being a clear paint means that the haze value of a dry film with a film thickness of 35 μm obtained by applying the base paint (X) is 25% or less. In the present invention, the haze value is defined as a value calculated using the following Equation (1) based on the diffuse light transmittance (DF) and parallel light transmittance (PT) of a coating film formed and cured on a smooth PTFE plate, and peeled off from the plate. The DF and PT of the coating film are measured using a Turbidimeter COH-300A (trade name, produced by Nippon Denshoku Industries Co., Ltd.).

$$\text{Haze value} = 100*DF/(DF+PT) \quad (1)$$

When the base paint (X) is a clear paint, a coloring pigment is not contained, and an extender pigment can be contained, if necessary. Examples of extender pigments include barium sulfate, barium carbonate, calcium carbonate, aluminum silicate, silica, magnesium carbonate, talc, alumina white, and the like.

When the above extender pigment is mixed, the amount thereof is preferably within the range of 0.1 to 30 parts by mass, and more preferably 0.1 to 20 parts by mass, based on 100 parts by mass of the resin solids content in the base paint (X).

When the base paint (X) is a colored paint, a coloring pigment is contained. The base paint (X) can contain titanium oxide, in terms of control of light transmittance, and can further contain conventionally known coloring pigments other than titanium oxide, if necessary. The coloring pigment is not particularly limited. Specific examples include composite metal oxide pigments, such as carbon black, iron oxide pigments and titan yellow; azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, indanthrone pigments, dioxan pigments, threne pigments, indigo pigments, effect pigments, and the like. Any of these pigments can be used singly or in a combination of two or more. Examples of effect pigments include those mentioned in the "Colored Paint (W)" section.

When the above coloring pigment is mixed, the amount thereof is preferably within the range of 0.1 to 50 parts by mass, and more preferably 0.2 to 40 parts by mass, based on 100 parts by mass of the resin solids content in the base paint (X).

The cured film thickness of the base coating film obtained from the base paint (X) is preferably 3 μm or more, more preferably 3 to 20 μm, and even more preferably 5 to 15 μm, in terms of smoothness and metallic luster.

Coating of the base paint (X) can be performed by a general method. For example, air spray coating, airless spray coating, rotary atomization coating, and like methods can be used. An electrostatic charge may be applied, if necessary, during coating of the base paint (X). In particular, rotary atomization electrostatic coating and air spray electrostatic coating are preferable, and rotary atomization electrostatic coating is particularly preferable.

When air spray coating, airless spray coating, or rotary atomization coating is performed, the base paint (X) is preferably adjusted to have a solids content and viscosity suitable for coating by suitably adding water and/or an organic solvent, and optionally additives, such as rheology control agents and antifoaming agents.

The solids content of the base paint (X) is preferably within the range of 10 to 60 mass %, more preferably 15 to 55 mass %, and even more preferably of 20 to 50 mass %. The viscosity of the base paint (X) at 20° C. at 6 rpm measured by a Brookfield type viscometer is preferably within the range of 200 to 7000 cps, more preferably 300 to 6000 cps, and even more preferably 500 to 5000 cps.

3. Step (3)

Step (3) is to apply an effect pigment dispersion (Y) to the base coating film formed in step (2) to form an effect coating film.

Effect Pigment Dispersion (Y)

The effect pigment dispersion (Y) contains water, a rheology control agent (A), and a flake-effect pigment (B). The solids content of the effect pigment dispersion (Y) is 0.5 to 10 mass %, and preferably 1 to 8 mass %. The flake-effect pigment (B) is an interference pigment in which a transparent or translucent base material is coated with a metal oxide. The flake-effect pigment (B) is contained in an amount of 30 to 90 parts by mass, preferably 33 to 85 parts by mass, and even more preferably 35 to 80 parts by mass, based on 100 parts by mass of the total solids content in the effect pigment dispersion.

Rheology Control Agent (A)

As the rheology control agent (A), a known rheology control agent can be used. Examples include silica-based fine powder, mineral-based rheology control agents, barium sulfate atomization powder, polyamide-based rheology control agents, organic resin fine particle rheology control agents, diurea-based rheology control agents, urethane association-type rheology control agents, polyacrylic acid-based rheology control agents, which are acrylic swelling-type, cellulose-based rheology control agents, and the like. Of these, particularly in terms of obtaining a coating film with excellent pearl luster, it is preferable to use a mineral-based rheology control agent, a polyacrylic acid-based rheology control agent, or a cellulose-based rheology control agent; and it is particularly preferable to use a cellulose-based rheology control agent. These rheology control agents can be used singly or in a combination of two or more.

Examples of mineral-based rheology control agents include swelling laminar silicate that has a 2:1 type crystal structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; vermiculite; substitution products or derivatives thereof; and mixtures thereof.

Examples of polyacrylic acid-based rheology control agents include sodium polyacrylate, polyacrylic acid-(meth) acrylic acid ester copolymers, and the like.

Examples of commercial products of the polyacrylic acid-based rheology control agent include "Primal ASE-60," "Primal TT615," and "Primal RM5" (trade names, produced by The Dow Chemical Company); "SN Thickener 613," "SN Thickener 618," "SN Thickener 630," "SN Thickener 634," and "SN Thickener 636" (trade names, produced by San Nopco Limited); and the like. The acid value of the solids content of the polyacrylic acid-based rheology control agent is within the range of 30 to 300 mgKOH/g, and preferably 80 to 280 mgKOH/g.

Examples of cellulose-based rheology control agents include carboxymethylcellulose, methylcellulose, hydroxyethylcellulose, hydroxyethylmethylcellulose, hydroxypropylmethylcellulose, methylcellulose, cellulose nanofibers, and the like. Of these, cellulose nanofibers are particularly preferably used, in terms of obtaining a coating film with excellent pearl luster.

The cellulose nanofibers may also be referred to as cellulose nanofibrils, fibrillated cellulose, or nanocellulose crystals.

The cellulose nanofibers have a number average fiber diameter within the range of preferably 2 to 500 nm, more preferably 2 to 250 nm, even more preferably 2 to 150 nm, in terms of obtaining a coating film with excellent pearl luster. The cellulose nanofibers also have a number average fiber length within the range of preferably 0.1 to 20 μm, more preferably 0.1 to 15 μm, even more preferably 0.1 to 10 μm. The aspect ratio determined by dividing a number average fiber length by a number average fiber diameter is within the range of preferably 50 to 10000, more preferably 50 to 5000, and even more preferably 50 to 1000.

The number average fiber diameter and number average fiber length are measured and calculated from, for example, an image obtained by subjecting a sample (cellulose nanofibers diluted with water) to a dispersion treatment, casting the sample on a grid coated with a carbon film that has been subjected to hydrophilic treatment, and observing the sample with a transmission electron microscope (TEM).

The cellulose nanofibers for use may be those obtained by defibrating a cellulose material and stabilizing it in water. The cellulose material as used here refers to cellulose-main materials in various forms. Specific examples include pulp (e.g., grass plant-derived pulp, such as wood pulp, jute, Manila hemp, and kenaf); natural cellulose, such as cellulose produced by microorganisms; regenerated cellulose obtained by dissolving cellulose in a copper ammonia solution, a solvent of a morpholine derivative, or the like, and subjecting the dissolved cellulose to spinning; and fine cellulose obtained by subjecting the cellulose material to mechanical treatment, such as hydrolysis, alkali hydrolysis, enzymatic decomposition, blasting treatment, vibration ball milling, and the like, to depolymerize the cellulose.

The method for defibrating the cellulose material is not particularly limited, as long as the cellulose material remains in a fibrous form. Examples of the method include mechanical defibration treatment using a homogenizer, a grinder, and the like; chemical treatment using an oxidation catalyst and the like; and biological treatment using microorganisms and the like.

For the cellulose nanofibers, anionically modified cellulose nanofibers can be used. Examples of anionically modified cellulose nanofibers include carboxylated cellulose nanofibers, carboxymethylated cellulose nanofibers, and the like. The anionically modified cellulose nanofibers can be obtained, for example, by incorporating functional groups such as carboxyl groups and carboxymethyl groups into a cellulose material by a known method, washing the obtained modified cellulose to prepare a dispersion of the modified cellulose, and defibrating this dispersion. The carboxylated cellulose is also referred to as oxidized cellulose.

The oxidized cellulose is obtained, for example, by oxidizing the cellulose material in water using an oxidizing agent in the presence of a compound selected from the group consisting of N-oxyl compounds, bromide, iodide, and mixtures thereof.

The amount of an N-oxyl compound is not particularly limited, as long as the amount is a catalytic amount that can disintegrate cellulose into nanofibers. The amount of bromide or iodide can be suitably selected within the range in which an oxidation reaction is promoted.

For the oxidizing agent, a known oxidizing agent may be used. Examples include halogen, hypohalous acid, halous acid, perhalogenic acid, salts thereof, halogen oxide, peroxide, and the like. It is preferable to set the conditions so that the amount of carboxyl groups in oxidized cellulose is 0.2 mmol/g or more based on the solids content mass of the oxidized cellulose. The amount of carboxyl groups can be adjusted, for example, by performing the following: adjustment of oxidation reaction time; adjustment of oxidation reaction temperature; adjustment of pH in oxidation reaction; and adjustment of the amount of an N-oxyl compound, bromide, iodide, oxidizing agent, or the like.

The above carboxymethylated cellulose can be obtained, for example, in the following manner. The cellulose material and a solvent are mixed, and mercerization treatment is performed using 0.5 to 20-fold moles of alkali hydroxide metal per glucose residue of the cellulose material as a mercerization agent at a reaction temperature of 0 to 70° C. for a reaction time of about 15 minutes to 8 hours. Thereafter, 0.05 to 10-fold moles of a carboxymethylating agent per glucose residue is added thereto, followed by reaction at a reaction temperature of 30 to 90° C. for about 30 minutes to 10 hours.

The degree of substitution of carboxymethyl per glucose unit in the modified cellulose obtained by introducing carboxymethyl groups into the cellulose material is preferably 0.02 to 0.5.

The thus-obtained anion-modified cellulose can be dispersed in an aqueous solvent to form a dispersion, and the dispersion can be further defibrated. Although the defibration method is not particularly limited, when mechanical treatment is performed, the device to be used may be any of the following: a high-speed shearing device, a collider device, a bead mill device, a high-speed rotating device, a colloid mill device, a high-pressure device, a roll mill device, and an ultrasonic device. These devices may be used in a combination of two or more.

Examples of commercial products of cellulose nanofibers include Rheocrysta (registered trademark) produced by DKS Co. Ltd., and the like.

The cellulose-based rheology control agent in the effect pigment dispersion (Y) is preferably contained in an amount of 2 to 150 parts by mass, and particularly preferably 3 to 120 parts by mass, based on 100 parts by mass of the flake-effect pigment, in terms of obtaining a coating film with excellent metallic luster.

The content of the rheology control agent (A) in the effect pigment dispersion (Y) as a solids content is preferably 0.01 to 5 parts by mass, more preferably 0.05 to 4 parts by mass, and even more preferably 0.1 to 3 parts by mass, based on 100 parts by mass of the effect pigment dispersion (Y), in terms of obtaining a coating film with excellent pearl luster.

Flake-Effect Pigment (B)

As the flake-effect pigment (B), it is preferable to use an interference pigment in which a transparent or translucent base material is coated with titanium oxide, in terms of imparting pearl luster to a multilayer coating film. In the present specification, the transparent base material refers to a base material that transmits at least 90% of visible light. The translucent base material refers to a base material that transmits at least 10% and less than 90% of visible light.

Interference pigments are effect pigments obtained by coating the surface of transparent or translucent flaky base materials, such as mica, artificial mica, glass, iron oxide, aluminum oxide, and various metal oxides, with metal oxides with different refractive indices. Examples of the metal oxide include titanium oxide and iron oxide. Interference pigments can develop various different interference colors depending on the difference in the thickness of the metal oxide.

Specific examples of the interference pigment include metal oxide-coated mica pigments, metal oxide-coated alumina flake pigments, metal oxide-coated glass flake pigments, and metal oxide-coated silica flake pigments, described below.

Metal oxide-coated mica pigments are pigments obtained by coating the surface of a natural mica or artificial mica base material with a metal oxide. Natural mica is a flaky base material obtained by pulverizing mica from ore. Artificial mica is synthesized by heating an industrial material, such as $SiO_2$, $MgO$, $Al_2O_3$, $K_2SiF_6$, or $Na_2SiF_6$, to melt the material at a high temperature of about 1500° C., and cooling the melt for crystallization. When compared with natural mica, artificial mica contains a smaller amount of impurities, and has a more uniform size and thickness. Specifically, known examples of artificial mica base materials include fluorophlogopite ($KMg_3AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na taeniolite ($NaMg_2LiSi_4O_{10}F_2$), and LiNa taeniolite ($LiMg_2LiSi_4O_{10}F_2$).

Metal oxide-coated alumina flake pigments are pigments obtained by coating the surface of an alumina flake base material with a metal oxide. Alumina flakes refer to flaky (thin) aluminum oxides, which are clear and colorless.

Alumina flakes do not necessarily consist of only aluminum oxide, and may contain other metal oxides.

Metal oxide-coated glass flake pigments are pigments obtained by coating the surface of a flaky glass base material with a metal oxide. The metal oxide-coated glass flake pigments have a smooth base material surface, which causes intense light reflection.

Metal oxide-coated silica flake pigments are pigments obtained by coating flaky silica, a base material having a smooth surface and a uniform thickness, with a metal oxide.

The above interference pigments may be subjected to surface treatment in order to improve dispersibility, water resistance, chemical resistance, weather resistance, or the like.

The average particle size of the interference pigment is preferably 5 to 30 µm, and particularly preferably 7 to 20 µm, in terms of the excellent distinctness of image and pearl luster of the coating film to be obtained. The particle size as used herein refers to the median size of a volume-based particle size distribution measured by a laser diffraction scattering method using a Microtrack MT3300 particle size distribution analyzer (trade name, produced by Nikkiso Co., Ltd.).

Moreover, the thickness of the interference pigment is preferably 0.05 to 1 µm, and particularly preferably 0.1 to 0.8 µm, in terms of the excellent distinctness of image and pearl luster of the coating film to be obtained. The thickness as used herein is obtained in such a manner that when a cross-section of a coating film containing an interference pigment is observed with an optical microscope, the minor axis of the interference pigment particles is measured using image-processing software, and the average of the measured values of 100 or more particles is defined as the thickness.

The content of the flake-effect pigment (B) in the effect pigment dispersion (Y) is 30 to 90 parts by mass, preferably 33 to 85 parts by mass, and even more preferably 35 to 80 parts by mass, based on 100 parts by mass of the total solids content in the effect pigment dispersion (Y), in terms of the excellent distinctness of image and pearl luster of the coating film to be obtained.

Other Components

In addition to water, the rheology control agent (A), and the flake-effect pigment (B), the effect pigment dispersion (Y) may further suitably contain additives, such as a surface adjusting agent (C), a crosslinkable component (D), an organic solvent, a pigment dispersant, an antisettling agent, an antifoaming agent, and a ultraviolet absorber, if necessary.

The surface adjusting agent (C) is used to facilitate uniform orientation of the above flake-effect pigment (B) dispersed in water on the substrate when the effect pigment dispersion (Y) is applied to the substrate.

As the surface adjusting agent (C), known surface adjusting agents can be used without limitation. In particular, in terms of the excellent distinctness of image and pearl luster of the coating film to be obtained, the surface adjusting agent (C) is preferably one having a contact angle of preferably 8 to 20°, more preferably 9 to 19°, and even more preferably 10 to 18°, with respect to a previously degreased tin plate (produced by Paltek Corporation), the contact angle being measured in such a manner that a liquid that is a mixture of isopropanol, water, and the surface adjusting agent (C) at a ratio of 4.5/95/1 is adjusted to have a viscosity of 150 mPa·s measured by a Brookfield type viscometer at a rotor rotational speed of 60 rpm at a temperature of 20° C., 10 µL of the liquid is added dropwise to the tin plate, and the contact angle with respect to the tin plate is measured 10 seconds after dropping. Specifically, the viscosity is controlled by adding Acrysol ASE-60 (trade name, a polyacrylic acid-based rheology control agent, produced by The Dow Chemical Company, solids content: 28%) and dimethylethanolamine.

The 4.5/95/1 ratio, which is the mass ratio of isopropanol/water/surface adjusting agent (C), corresponds to the component ratio of the effect pigment dispersion (Y) for evaluating the surface adjusting agent. The 150 mPa·s viscosity measured by a Brookfield type viscometer at a rotor rotational speed of 60 rpm is a normal value during coating to a substrate. Moreover, the 8 to 20° contact angle with respect to the tin plate represents the wet spreading of liquid under standard coating conditions. When the contact angle is 8° or more, the liquid is applied to a substrate without being overly spread; whereas when the contact angle is 20° or less, the liquid is uniformly applied to a substrate without being overly repelled.

Examples of the surface adjusting agent (C) include silicone-based surface adjusting agents, acrylic-based surface adjusting agents, vinyl-based surface adjusting agents, and fluorine-based surface adjusting agents. These surface adjusting agents can be used singly or in a combination of two or more.

Examples of commercial products of the surface adjusting agent (C) include BYK series (produced by BYK-Chemie), Tego series (produced by Evonik), Glanol series and Polyflow series (produced by Kyoeisha Chemical Co., Ltd.), DISPARLON series (produced by Kusumoto Chemicals, Ltd.), and the like.

Usable silicone-based surface adjusting agents include polydimethylsiloxane and modified silicone obtained by modifying polydimethylsiloxane. Examples of modified silicone include polyether-modified silicone, acrylic-modified silicone, polyester-modified silicone, and the like.

The dynamic surface tension of the surface adjusting agent (C) is preferably 50 to 70 mN/m, more preferably 53 to 68 mN/m, and even more preferably 55 to 65 mN/m. In the present specification, the "dynamic surface tension" refers to a surface tension value measured by the maximum bubble pressure method at a frequency of 10 Hz. The dynamic surface tension was measured using a SITA measuring apparatus (SITA t60, produced by EKO Instruments).

Moreover, the static surface tension of the surface adjusting agent (C) is preferably 15 to 30 mN/m, more preferably 18 to 27 mN/m, and even more preferably 20 to 24 mN/m. In the present specification, the "static surface tension" refers to a surface tension value measured by the platinum ring method. The static surface tension was measured using a surface tensiometer (DCAT 21, produced by EKO Instruments).

Furthermore, the lamellar length of the surface adjusting agent (C) is preferably 6 to 9 mm, more preferably 6.5 to 8.5 mm, and even more preferably 7 to 8 mm.

The content of the surface adjusting agent (C) in the effect pigment dispersion (Y) as a solids content is preferably 0.01 to 4 parts by mass, more preferably 0.05 to 3 parts by mass, and even more preferably 0.1 to 2 parts by mass, based on 100 parts by mass of the effect pigment dispersion (Y), in terms of the excellent pearl luster of the multilayer coating film to be obtained.

The effect pigment dispersion (Y) may contain a base resin and/or a crosslinkable component (D), and a dispersion resin, in terms of the anti-water adhesion and/or storage stability of the coating film to be obtained.

Examples of the base resin include acrylic resins, polyester resins, alkyd resins, urethane resins, and the like.

As the dispersion resin, existing dispersion resins, such as acrylic resins, epoxy resins, polycarboxylic acid resins, and polyester resins, can be used.

When the effect pigment dispersion (Y) contains resin components, such as a base resin, a crosslinkable component (D), and a dispersion resin, the total amount thereof is preferably 0.01 to 500 parts by mass, more preferably 5 to 300 parts by mass, and even more preferably 10 to 200 parts by mass, based on 100 parts by mass of the flake-effect pigment.

The effect pigment dispersion (Y) may contain a crosslinkable component (D), in terms of the anti-water adhesion of the coating film to be obtained. In particular, when a clear paint (Z), described later, is a one-component clear paint and does not contain the crosslinkable component (D), it is preferable that the effect pigment dispersion (Y) contains the crosslinkable component (D).

In the present specification, the crosslinkable component (D) is selected from the group consisting of melamine, a melamine derivative, a urea resin, (meth)acrylamide, polyaziridine, polycarbodiimide, a blocked or unblocked polyisocyanate compound, (meth)acrylamide, and a copolymer of N-methylol group- or N-alkoxymethyl group-containing (meth)acrylamide. These may be used singly or in a combination of two or more.

Examples of melamine derivatives include partially etherified or fully etherified melamine resins produced by etherifying a part or all of methylol groups in methylolated melamine with a $C_{1-8}$ monohydric alcohol, such as methyl alcohol, ethyl alcohol, n-propyl alcohol, i-propyl alcohol, n-butyl alcohol, i-butyl alcohol, 2-ethylbutanol, or 2-ethylhexanol.

Examples of commercially available melamine derivatives include Cymel 202, Cymel 232, Cymel 235, Cymel 238, Cymel 254, Cymel 266, Cymel 267, Cymel 272, Cymel 285, Cymel 301, Cymel 303, Cymel 325, Cymel 327, Cymel 350, Cymel 370, Cymel 701, Cymel 703, and Cymel 1141 (all produced by Nihon Cytec Industries Inc.); U-Van 20SE60, U-Van 122, and U-Van 28-60 (all produced by Mitsui Chemicals, Inc.); Super Beckamine J-820-60, Super Beckamine L-127-60, and Super Beckamine G-821-60 (all produced by DIC); and the like. The above melamine and melamine derivatives can be used singly or in a combination of two or more.

Examples of the N-methylol group- or N-alkoxymethyl group-containing (meth)acrylamide include (meth)acrylamides, such as N-methylolacrylamide, N-methoxymethylacrylamide, N-methoxybutylacrylamide, and N-butoxymethyl(meth)acrylamide. The above (meth)acrylamide derivatives can be used singly or in a combination of two or more.

The unblocked polyisocyanate compound is a compound having at least two isocyanate groups per molecule. Examples include aliphatic polyisocyanates, alicyclic polyisocyanates, aliphatic-aromatic polyisocyanates, aromatic polyisocyanates, derivatives of these polyisocyanates, and the like.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanate-4-isocyanatomethyloctane, 1,3,6-triisocyanatohexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name: hydrogenated xylylene diisocyanate) or mixtures thereof, and methylenebis(4,1-cyclohexanediyl)diisocyanate (common name: hydrogenated MDI), and norbornane diisocyanate; alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethy-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aromatic-aliphatic polyisocyanates include aromatic-aliphatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aromatic-aliphatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4''-triisocyanate, 1,3,5-triisocyanatobenzene, and 2,4,6-triisocyanatotoluene; aromatic tetraisocyanates, such as 4,4'-diphenylmethane-2,2',5,5'-tetraisocyanate; and the like.

Examples of polyisocyanate derivatives include dimers, trimers, biurets, allophanates, urethodiones, urethoimines, isocyanurates, oxadiazinetriones, polymethylene polyphenyl polyisocyanates (crude MDI, polymeric MDI), crude TDI, and the like, of the above-mentioned polyisocyanates. These polyisocyanate derivatives may be used singly or in a combination of two or more. The above polyisocyanates and derivatives thereof may be used singly or in a combination of two or more.

Among the aliphatic diisocyanates, hexamethylene diisocyanate or derivatives thereof are preferably used, and among the alicyclic diisocyanates, 4,4'-methylenebis(cyclohexyl isocyanate) is preferably used. Of these, derivatives of hexamethylene diisocyanate are particularly the most preferable, in terms of adhesion, compatibility, and the like.

As the polyisocyanate compound, it is also possible to use a prepolymer formed by reacting the polyisocyanate or a derivative thereof with a compound having active hydrogen, such as hydroxy or amino, and reactive to the polyisocyanate under conditions such that the isocyanate groups are present in excess. Examples of the compound reactive to the polyisocyanate include polyhydric alcohols, low-molecular-weight polyester resins, amine, water, and the like. The above polyisocyanate compounds can be used singly or in a combination of two or more.

The blocked polyisocyanate compound is a blocked polyisocyanate compound in which some or all of the isocyanate groups of the above polyisocyanate or a derivative thereof are blocked with a blocking agent.

Examples of the blocking agent include phenol-based blocking agents, lactam-based blocking agents, aliphatic alcohol-based blocking agents, ether-based blocking agents, alcohol-based blocking agents, oxime-based blocking agents, active methylene-based blocking agents, mercaptan-based blocking agents, acid amide-based blocking agents, imide-based blocking agents, amine-based blocking agents, imidazole-based blocking agents, urea-based blocking agents, carbamate-based blocking agents, imine-based blocking agents, sulfite-based blocking agents, azole-based compounds, and the like.

Examples of phenol-based blocking agents include phenol, cresol, xylenol, nitrophenol, ethylphenol, hydroxydiphenyl, butylphenol, isopropylphenol, nonylphenol, octylphenol, and methyl hydroxybenzoate.

Examples of lactam-based blocking agents include ε-caprolactam, δ-valerolactam, γ-butyrolactam, and β-propiolactam.

Examples of aliphatic alcohol-based blocking agents include methanol, ethanol, propyl alcohol, butyl alcohol, amyl alcohol, and lauryl alcohol.

Examples of ether-based blocking agents include ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol.

Examples of alcohol-based blocking agents include benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate.

Examples of oxime-based blocking agents include formamide oxime, acetamide oxime, acetoxime, methyl ethyl ketoxime, diacetyl monoxime, benzophenone oxime, and cyclohexane oxime.

Examples of active methylene-based blocking agents include dimethyl malonate, diethyl malonate, ethyl acetoacetate, methyl acetoacetate, and acetylacetone.

Examples of mercaptan-based blocking agents include butyl mercaptan, t-butyl mercaptan, hexyl mercaptan, t-dodecyl mercaptan, 2-mercaptobenzothiazole, thiophenol, methylthiophenol, and ethylthiophenol.

Examples of acid amide-based blocking agents include acetanilide, acetanisidide, acetotoluide, acrylamide, methacrylamide, acetic acid amide, stearic acid amide, and benzamide.

Examples of imide-based blocking agents include succinimide, phthalimide, and maleimide.

Examples of amine-based blocking agents include diphenylamine, phenylnaphthylamine, xylidine, N-phenylxylidine, carbazole, aniline, naphthylamine, butylamine, dibutylamine, and butylphenylamine.

Examples of imidazole-based blocking agents include imidazole and 2-ethylimidazole.

Examples of urea-based blocking agents include urea, thiourea, ethyleneurea, ethylenethiourea, and diphenylurea.

Examples of carbamate-based blocking agents include phenyl N-phenylcarbamate.

Examples of imine-based blocking agents include ethyleneimine and propyleneimine.

Examples of sulfite-based blocking agents include sodium bisulfite and potassium bisulfite.

Examples of azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

When blocking is performed (a blocking agent is reacted), it can be performed by adding a solvent, if necessary. As the solvent used in the blocking reaction, a solvent that is not reactive with an isocyanate group is preferably used. Examples include ketones, such as acetone and methyl ethyl ketone; esters, such as ethyl acetate; N-methyl-2-pyrrolidone (NMP); and like solvents. The above blocked polyisocyanate compounds can be used singly or in a combination of two or more.

When the effect pigment dispersion (Y) contains a crosslinkable component (D), the content thereof as a solids content is preferably within the range of 1 to 100 parts by mass, more preferably 5 to 95 parts by mass, and even more preferably 10 to 90 parts by mass, based on 100 parts by mass of the solids content of the flake-effect pigment (B) in the effect pigment dispersion (Y), in terms of the anti-water adhesion of the coating film.

When the effect pigment dispersion (Y) contains a base resin and a dispersion resin described above, and further contains a crosslinkable component (D), the total amount as a solids content of the base resin, the dispersion resin, and the crosslinkable component (D) is, in terms of forming a coating film with metallic luster, preferably within the range of 1 to 500 parts by mass, more preferably 5 to 300 parts by mass, and even more preferably 10 to 100 parts by mass, based on 100 parts by mass of the solids content of the flake-effect pigment (B) in the effect pigment dispersion (Y), in terms of the anti-water adhesion of the coating film.

The effect pigment dispersion (Y) may contain pigments other than the flake-effect pigment (B), such as other flake-effect pigments, coloring pigments, and extender pigments, if necessary.

Examples of flake-effect pigments other than the flake-effect pigment (B) include aluminum flake pigments, vapor deposition metal flake pigments, and the like.

The coloring pigment is not particularly limited, Specific examples include composite metal oxide pigments, such as titan yellow; inorganic pigments, such as transparent iron oxide pigments; organic pigments, such as azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, indanthrone pigments, dioxazine pigments, threne pigments, and indigo pigments; carbon black pigments; and the like. These can be used singly or in a combination of two or more.

Examples of extender pigments include talc, silica, calcium carbonate, barium sulfate, zinc white (zinc oxide), and the like. These can be used singly or in a combination of two or more.

The effect pigment dispersion (Y) is prepared by mixing and dispersing the above components. The solids content during coating is 0.5 to 10 mass %, and preferably 1 to 8 mass %, based on the effect pigment dispersion (Y), in terms of obtaining a coating film with low graininess and excellent pearl luster. When the solids content is lower than 0.5 mass %, pearl luster is impaired.

The viscosity of the effect pigment dispersion (Y) at a temperature of 20° C. measured by a Brookfield type viscometer at 60 rpm after 1 minute (also referred to as "the B60 value" in the present specification) is preferably 50 to 900 mPa·s, and more preferably 100 to 800 mPa·s, in terms of obtaining a coating film with excellent pearl luster. The viscometer used in this case is a digital Vismetron viscometer VDA-type (a Brookfield type viscometer, produced by Shibaura System Co., Ltd.).

The effect pigment dispersion (Y) can be applied by a method such as electrostatic coating, air spray coating, or airless spray coating. In the method for forming a multilayer coating film of the present invention, rotary atomization electrostatic coating is particularly preferable.

The film thickness 30 seconds after the effect pigment dispersion (Y) is attached to the substrate is preferably 3 to 100 μm, more preferably 4 to 80 μm, and even more preferably 5 to 60 μm, in terms of obtaining a coating film with excellent pearl luster.

The dry film thickness of the effect coating film is preferably 0.2 to 5 μm, more preferably 0.3 to 3 μm, and particularly preferably 0.5 to 2 μm, in terms of obtaining a coating film with excellent pearl luster.

In the present specification, the dry film thickness is calculated from the following formula (2):

$$x = (sc*10000)/(S*sg) \quad (2)$$

x: film thickness [μm]
sc: coating solids content [g]
S: evaluation area of coating solids content [cm$^2$]
sg: coating film specific gravity [g/cm$^3$]

4. Step (4)

Step (4) is to apply a clear paint (Z) to the effect coating film formed in step (3) to form a clear coating film.

Clear Paint (Z)

The clear paint (Z) may be a one-component clear paint containing a base resin and a curing agent, or a two-component clear paint having a hydroxy-containing resin and a polyisocyanate compound.

The clear paint (Z) is preferably a two-component clear paint having a hydroxy-containing resin and an isocyanate group containing compound, in terms of the adhesion and pearl luster of the multilayer coating film to be obtained.

Hydroxy-Containing Resin

As the hydroxy-containing resin, conventionally known resins can be used without limitation, as long as they are resins containing a hydroxyl group. Examples of the hydroxy-containing resin include hydroxy-containing acrylic resins, hydroxy-containing polyester resins, hydroxy-containing polyether resins, hydroxy-containing polyurethane resins, and the like; preferably hydroxy-containing acrylic resins and hydroxy-containing polyester resins; and particularly preferably hydroxy-containing acrylic resins.

The hydroxy value of the hydroxy-containing acrylic resin is preferably within the range of 80 to 200 mgKOH/g, and more preferably 100 to 180 mgKOH/g. When the hydroxy value is 80 mgKOH/g or more, the crosslinking density is high, and thus the scratch resistance is sufficient.

Further, when the hydroxy value is 200 mgKOH/g or less, the water resistance of the coating film is satisfied.

The weight average molecular weight of the hydroxy-containing acrylic resin is preferably within the range of 2500 to 40000, and more preferably 5000 to 30000. When the weight average molecular weight is 2500 or more, the coating film performance, such as acid resistance, is satisfied. When the weight average molecular weight is 40000 or less, the smoothness of the coating film is sufficient, and thus the finish is satisfied.

In the present specification, the weight average molecular weight refers to a value calculated from a chromatogram measured by gel permeation chromatography based on the molecular weight of standard polystyrene. For the gel permeation chromatography, "HLC8120GPC" (produced by Tosoh Corporation) was used. The measurement was conducted using four columns: "TSKgel G-4000HXL," "TSKgel G-3000HXL," "TSKgel G-2500HXL," and "TSKgel G-2000HXL" (trade names, all produced by Tosoh Corporation) under the following conditions: mobile phase: tetrahydrofuran, measuring temperature: 40° C., flow rate: 1 cc/min, and detector: RI.

The glass transition temperature of the hydroxy-containing acrylic resin is −40° C. to 20° C., and particularly preferably −30° C. to 10° C. When the glass transition temperature is −40° C. or more, the coating film hardness is sufficient. When the glass transition temperature is 20° C. or less, the coating surface smoothness of the coating film is satisfied.

Polyisocyanate Compound

A polyisocyanate compound is a compound having at least two isocyanate groups per molecule. Examples include aliphatic polyisocyanates, alicyclic polyisocyanates, aliphatic-aromatic polyisocyanates, aromatic polyisocyanates, derivatives of these polyisocyanates, and the like.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimer acid diisocyanate, and methyl 2,6-diisocyanatohexanoate (common name: lysine diisocyanate); aliphatic triisocyanates, such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanatomethyloctane, 1,3,6-triisocyanatohexane, and 2,5,7-trimethyl-1,8-diisocyanato-5-isocyanatomethyloctane; and the like.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4-methyl-1,3-cyclohexylene diisocyanate (common name: hydrogenated TDI), 2-methyl-1,3-cyclohexylene diisocyanate, 1,3- or 1,4-bis(isocyanatomethyl)cyclohexane (common name; hydrogenated xylylene diisocyanate) or mixtures thereof, and methylenebis(4,1-cyclohexanediyl)diisocyanate (common name: hydrogenated MDI), and norbamane diisocyanate; alicyclic triisocyanates, such as 1,3,5-triisocyanatocyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2- isocyanatoethyl)-2-isocyanatomethy-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1)heptane; and the like.

Examples of aliphatic-aromatic polyisocyanates include aliphatic-aromatic diisocyanates, such as methylenebis(4,1-phenylene)diisocyanate (common name: MDI), 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; aliphatic-aromatic triisocyanates, such as 1,3,5-triisocyanatomethylbenzene; and the like.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4-tolylene diisocyanate (common name: 2,4-TDI), or 2,6-tolylene diisocyanate (common name: 2,6-TDI) or mixtures thereof, 4,4'-toluidine diisocyanate, and 4,4'-diphenylether diisocyanate; aromatic triisocyanates, such as triphenylmethane-4,4',4''-triisocyanate, 1,3,5-triisocyanatobenzene, and 2,4,6-triisocyanatotoluene; aromatic tetraisocyanates, such as 4,4'-diphenylmethane-2,2',5,5'-tetraisocyanate; and the like.

Examples of polyisocyanate derivatives include dimers, trimers, biurets, allophanates, urethodiones, urethoimines, isocyanurates, oxadiazinetriones, polymethylene polyphenyl polyisocyanates (crude MDI, polymeric MDI), crude TDI, and the like, of the above-mentioned polyisocyanates. These polyisocyanate derivatives may be used singly or in a combination of two or more.

The above polyisocyanates and derivatives thereof may be used singly or in a combination of two or more.

Among the aliphatic diisocyanates, hexamethylene diisocyanate or derivatives thereof are preferably used, and among the alicyclic diisocyanates, 4,4'-methylenebis(cyclohexyl isocyanate) is preferably used. Of these, derivatives of hexamethylene diisocyanate are particularly the most preferable, in terms of adhesion, compatibility, and the like.

As the polyisocyanate compound, a prepolymer is also usable that is formed by reacting the polyisocyanate or a derivative thereof with a compound having active hydrogen, such as hydroxy or amino, and reactive to the polyisocyanate under conditions such that the isocyanate groups are present in excess. Examples of the compound reactive to the polyisocyanate include polyhydric alcohols, low-molecular-weight polyester resins, amine, water, and the like.

The polyisocyanate compound for use may be a blocked polyisocyanate compound in which some or all of the isocyanate groups of the above polyisocyanate or a derivative thereof are blocked with a blocking agent.

Examples of the blocking agent include phenol-based blocking agents, lactam-based blocking agents, aliphatic alcohol-based blocking agents, ether-based blocking agents, alcohol-based blocking agents, oxime-based blocking agents, active methylene-based blocking agents, mercaptan-based blocking agents, acid amide-based blocking agents, imide-based blocking agents, amine-based blocking agents, imidazole-based blocking agents, urea-based blocking agents, carbamate-based blocking agents, imine-based blocking agents, sulfite-based blocking agents, azole-based compounds, and the like.

Examples of phenol-based blocking agents include phenol, cresol, xylenol, nitrophenol, ethylphenol, hydroxydiphenyl, butylphenol, isopropylphenol, nonylphenol, octylphenol, and methyl hydroxybenzoate.

Examples of lactam-based blocking agents include ε-caprolactam, δ-valerolactam, γ-butyrolactam, and β-propiolactam.

Examples of aliphatic alcohol-based blocking agents include methanol, ethanol, propyl alcohol, butyl alcohol, amyl alcohol, and lauryl alcohol.

Examples of ether-based blocking agents include ethylene glycol monomethyl ether, ethylene glycol monoethyl ether, ethylene glycol monobutyl ether, diethylene glycol monomethyl ether, diethylene glycol monoethyl ether, propylene glycol monomethyl ether, and methoxymethanol.

Examples of alcohol-based blocking agents include benzyl alcohol, glycolic acid, methyl glycolate, ethyl glycolate, butyl glycolate, lactic acid, methyl lactate, ethyl lactate, butyl lactate, methylol urea, methylol melamine, diacetone alcohol, 2-hydroxyethyl acrylate, and 2-hydroxyethyl methacrylate.

Examples of oxime-based blocking agents include formamide oxime, acetamide oxime, acetoxime, methyl ethyl ketoxime, diacetyl monoxime, benzophenone oxime, and cyclohexane oxime.

Examples of active methylene-based blocking agents include dimethyl malonate, diethyl malonate, ethyl acetoacetate, methyl acetoacetate, and acetylacetone.

Examples of mercaptan-based blocking agents include butyl mercaptan, t-butyl mercaptan, hexyl mercaptan, t-dodecyl mercaptan, 2-mercaptobenzothiazole, thiophenol, methylthiophenol, and ethylthiophenol.

Examples of acid amide-based blocking agents include acetanilide, acetanisidide, acetotoluide, acrylamide, methacrylamide, acetic acid amide, stearic acid amide, and benzamide.

Examples of imide-based blocking agents include succinimide, phthalimide, and maleimide.

Examples of amine-based blocking agents include diphenylamine, phenylnaphthylamine, xylidine, N-phenylxylidine, carbazole, aniline, naphthylamine, butylamine, dibutylamine, and butylphenylamine.

Examples of imidazole-based blocking agents include imidazole and 2-ethylimidazole.

Examples of urea-based blocking agents include urea, thiourea, ethyleneurea, ethylenethiourea, and diphenylurea.

Examples of carbamate-based blocking agents include phenyl N-phenylcarbamate.

Examples of imine-based blocking agents include ethyleneimine and propyleneimine.

Examples of sulfite-based blocking agents include sodium bisulfite and potassium bisulfite.

Examples of azole-based compounds include pyrazole or pyrazole derivatives, such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, and 3-methyl-5-phenylpyrazole; imidazole or imidazole derivatives, such as imidazole, benzimidazole, 2-methylimidazole, 2-ethylimidazole, and 2-phenylimidazole; and imidazoline derivatives, such as 2-methylimidazoline and 2-phenylimidazoline.

When blocking is performed (a blocking agent is reacted), it can be performed by adding a solvent, if necessary. As the solvent used in the blocking reaction, a solvent that is not reactive with an isocyanate group is preferably used. Examples include ketones, such as acetone and methyl ethyl ketone; esters, such as ethyl acetate; N-methyl-2-pyrrolidone (NMP); and like solvents. The polyisocyanate compounds can be used singly or in a combination of two or more.

The polyisocyanate compounds can be used singly or in a combination of two or more. In the two-component clear paint of the present invention, the equivalent ratio of the hydroxy groups in the hydroxy-containing resin to the isocyanate groups in the polyisocyanate compound (NCO/OH) is preferably within the range of 0.5 to 2.0, and more preferably 0.8 to 1.5, in terms of the curability and scratch resistance of the coating film.

Examples of combinations of a base resin and a curing agent in the one-component clear paint include a carboxy-containing resin and an epoxy-containing resin, a hydroxy-containing resin and a blocked polyisocyanate compound, a hydroxy-containing resin and a melamine resin, and the like. When a one-component paint is used as the clear paint (Z), the clear paint (Z) preferably contains a crosslinkable component (D) in terms of the anti-water adhesion of the coating film to be obtained. In particular, when the effect pigment dispersion (Y) does not contain the crosslinkable component (D), the clear paint (Z) preferably contains the crosslinkable component (D).

As the crosslinkable component (D), those described in the "Effect Pigment Dispersion (Y)" section can be used.

When the clear paint (Z) contains the crosslinkable component (D), the content thereof as a solids content is preferably within the range of 5 to 60 parts by mass, more preferably 10 to 50 parts by mass, and even more preferably 15 to 40 parts by mass, based on 100 parts by mass of the resin solids content of the clear paint (Z), in terms of the anti-water adhesion of the coating film.

The clear paint (Z) may suitably contain additives, such as solvents (e.g., water and organic solvents), curing catalysts, antifoaming agents, and ultraviolet absorbers, if necessary.

The clear paint (Z) may suitably contain a coloring pigment within a range that does not impair transparency. As the coloring pigment, conventionally known pigments for ink or paints can be used singly or in a combination of two or more. The amount thereof to be added may be suitably determined, but is preferably 30 parts by mass or less, and more preferably 0.01 to 10 parts by mass, based on 100 parts by mass of the vehicle-forming resin composition in the clear paint (Z).

The form of the clear paint (Z) is not particularly limited. The clear paint (Z) is generally used as an organic solvent-based paint composition. Examples of the organic solvent used in this case include various organic solvents for paints, such as aromatic or aliphatic hydrocarbon solvents, ester solvents, ketone solvents, ether solvents, and the like. As the organic solvent used herein, the one used in the preparation of the hydroxy-containing resin may be used as is, or other organic solvents may be further suitably added.

The solids concentration of the clear paint (Z) is preferably about 30 to 70 mass %, and more preferably about 40 to 60 mass %.

The clear paint (Z) is applied to the effect coating film. The coating of the clear paint (Z) is not particularly limited, and the same method as those for the colored paint (X) and the effect pigment dispersion (Y) may be used. For example, the clear paint (Z) can be applied by a coating method, such as air spray coating, airless spray coating, rotary atomization coating, or curtain coating. In these coating methods, an electrostatic charge may be applied, if necessary. Among these, rotary atomization coating using an electrostatic charge is preferable. The coating amount of the clear paint (Z) is generally preferably an amount in which the cured film thickness is about 10 to 50 µm.

Moreover, when the clear paint (Z) is applied, it is preferable to suitably adjust the viscosity of the clear paint (Z) within a viscosity range suitable for the coating method. For example, for rotary atomization coating using an electrostatic charge, it is preferable to suitably adjust the viscosity of the clear paint (Z) within a range of about 15 to 60 seconds measured by a Ford cup No. 4 viscometer at 20° C. using a solvent, such as an organic solvent.

After the clear paint (Z) is applied to form a clear coating film, for example, preheating can be performed at a temperature of about 50 to 80° C. for about 3 to 10 minutes so as to promote the vaporization of volatile components.

Step (5)

Step (5) is to heat the uncured base coating film, the uncured effect coating film, and the uncured clear coating film formed in steps (2) to (4) to simultaneously cure these three coating films.

Heating can be performed by a known means. For example, a drying furnace, such as a hot-blast stove, an electric furnace, or an infrared beam heating furnace, can be used. The heating temperature is preferably within the range of 70 to 150° C., and more preferably 80 to 140° C. The heating time is not particularly limited, but is preferably within the range of 10 to 40 minutes, and more preferably 20 to 30 minutes.

The multilayer coating film obtained in the present invention has excellent pearl luster and anti-water adhesion. Pearl luster is a texture with strong multiple reflection light of irradiated light, and with low graininess. The intensity of multiple reflection light of irradiated light is generally expressed by a Y value that expresses luminance in the XYZ color space. Particularly in the present specification, pearl luster is evaluated using a Y5 value that is characteristic to pearl luster, i.e., luminance in the XYZ color space based on the spectral reflectance of light illuminated at an angle of 45 degrees with respect to the coating film and received at an angle of 5 degrees deviated from specular reflection light in the incident light direction. In terms of pearl luster, the Y5 value of the multilayer coating film is preferably 400 to 1000.

The graininess (HG value) is evaluated as a hi-light graininess value (hereinafter abbreviated as the "HG value"). The HG value is a parameter of microscopic brilliance obtained by microscopic observation, and indicates the graininess in the highlight (observation of the coating film from near the specular reflection light against incident light). The HG value is calculated as follows. First, the coating film is photographed with a CCD camera at a light incidence angle of 15° and a receiving angle of 0°, and the obtained digital image data (i.e., two-dimensional brilliance distribution data) is subjected to two-dimensional Fourier transformation to obtain a power spectrum image. Subsequently, only the spatial frequency area corresponding to graininess is extracted from the power spectrum image, and the obtained measurement parameter is converted to an HG value from 0 to 100 that has a linear relation with graininess. In terms of pearl luster, the HG value of the multilayer coating film is preferably 20 to 65.

EXAMPLES

The present invention is described in more detail below with reference to Examples and Comparative Examples.

However, the present invention is not limited only to these Examples. "Part(s)" and "%" are both based on mass.

Production of Acrylic Resin Aqueous Dispersion

Production Example 1

128 parts of deionized water and 2 parts of "Adeka Reasoap SR-1025" (trade name, produced by Adeka, emulsifier, active ingredient: 25%) were placed in a reaction vessel equipped with a thermometer, a thermostat, a stirrer, a reflux condenser, a nitrogen inlet tube, and a dropping funnel. The mixture was stirred and mixed in a nitrogen flow, and heated to 80° C.

Subsequently, 1% of the entire amount of monomer emulsion for the core portion, which is described below, and 5.3 parts of a 6% ammonium persulfate aqueous solution were introduced into the reaction vessel, and maintained therein at 80° C. for 15 minutes. Thereafter, the remaining monomer emulsion for the core portion was added dropwise over a period of 3 hours to the reaction vessel maintained at the same temperature. After completion of the dropwise addition, the mixture was aged for 1 hour. Subsequently, a monomer emulsion for the shell portion, which is described below, was added dropwise over a period of 1 hour, followed by aging for 1 hour. Thereafter, the mixture was cooled to 30° C. while gradually adding 40 parts of a 5% 2-(dimethylamino)ethanol aqueous solution thereto, and filtered through a 100-mesh nylon cloth, thereby obtaining an acrylic resin aqueous dispersion (R-1) having a mean particle size of 100 nm and a solids content of 30%. The obtained acrylic resin aqueous dispersion had an acid value of 33 mg KOH/g and a hydroxy value of 25 mg KOH/g.

A monomer emulsion for the core portion: 40 parts of deionized water, 2.8 parts of "Adeka RiaSoap SR-1025," 2.1 parts of methylene bisacrylamide, 2.8 parts of styrene, 16.1 parts of methyl methacrylate, 28 parts of ethyl acrylate, and 21 parts of n-butyl acrylate were mixed and stirred, thereby obtaining a monomer emulsion for the core portion.

A monomer emulsion for the shell portion: 17 parts of deionized water, 1.2 parts of "Adeka RiaSoap SR-1025", 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate were mixed and stirred, thereby obtaining a monomer emulsion for the shell portion.

Production of Acrylic Resin Solution

Production Example 2

35 parts of propylene glycol monopropyl ether was placed into a reaction vessel equipped with a thermometer, a thermostat, a stirrer, a reflux condenser, a nitrogen inlet tube, and a dropping funnel, and heated to 85° C. Subsequently, a mixture comprising 30 parts of methyl methacrylate, 20 parts of 2-ethylhexyl acrylate, 29 parts of n-butyl acrylate, 15 parts of 2-hydroxyethyl acrylate, 6 parts of acrylic acid, 15 parts of propylene glycol monopropyl ether, and 2,3 parts of 2,2'-azobis(2,4-dimethylvaleronitrile) was added dropwise thereto over a period of 4 hours. After completion of the dropwise addition, the mixture was aged for 1 hour. Subsequently, a mixture of 10 parts of propylene glycol monopropyl ether and 1 part of 2,2'-azobis(2,4-dimethylvaleronitrile) was further added dropwise thereto over a period of 1 hour. After completion of the dropwise addition, the mixture was aged for 1 hour, 7.4 parts of diethanolamine was further added thereto, thereby obtaining an acrylic resin solution (R-2) having a solids content of 55%. The obtained hydroxy-containing acrylic resin had an acid value of 47 mg KOH/g, a hydroxy value of 72 mg KOH/g, and a weight average molecular weight of 58000.

Production of Polyester Resin Solution

Production Example 3

109 parts of trimethylolpropane, 141 parts of 1,6-hexanediol, 126 parts of 1,2-cyclohexanedicarboxylic acid anhydride, and 120 parts of adipic acid were placed into a reaction vessel equipped with a thermometer, a thermostat, a stirrer, a reflux condenser, and a water separator. The mixture was heated to a range of 160 to 230° C. over a period of 3 hours, followed by a condensation reaction at 230° C. for 4 hours. Subsequently, to introduce a carboxy group to the obtained condensation reaction product, 38.3 parts of trimellitic anhydride was added to the product, followed by a reaction at 170° C. for 30 minutes. Thereafter, the product was diluted with 2-ethyl-1-hexanol, thereby obtaining a polyester resin solution (R-3) having a solids content of 70%. The obtained hydroxy-containing polyester resin had an acid value of 46 mg KOH/g, a hydroxy value of 150 mg KOH/g, and a number average molecular weight of 1,400.

Production of Phosphate Group-Containing Acrylic Resin

Production Example 4

A mixed solvent of 27.5 parts of methoxy propanol and 27.5 parts of isobutanol was placed in a reaction vessel equipped with a thermometer, a thermostat, a stirrer, a reflux condenser, and a dropping funnel, and heated to 110° C. While the temperature was maintained at 110° C., 121.5 parts of a mixture comprising 25 parts of styrene, 27.5 parts of n-butyl methacrylate, 20 parts of branched higher alkyl acrylate (trade name; "Isostearyl Acrylate," produced by Osaka Organic Chemical Industry Ltd.), 7.5 parts of 4-hydroxybutyl acrylate, 15 parts of a phosphate group-containing polymerizable monomer described below, 12.5 parts of 2-methacryloyloxyethyl acid phosphate, 10 parts of isobutanol, and 4 parts of tert-butylperoxy octanoate was added dropwise to the above mixed solvent over 4 hours. Further, a mixture comprising 0.5 parts of tert-butylperoxy octanoate and 20 parts of isopropanol was added dropwise for 1 hour. Then, the resultant was stirred and aged for 1 hour, thereby obtaining a phosphate group-containing acrylic resin solution (R-4) having a solids content of 50%. The phosphate group-containing acrylic resin had an acid value of 83 mgKOH/g, a hydroxy value of 29 mgKOH/g, and a weight average molecular weight of 10,000.

Phosphate group-containing polymerizable monomer: 57.5 parts of monobutyl phosphoric acid and 41 parts of isobutanol were placed in a reaction vessel equipped with a thermometer, a thermostat, a stirrer, a reflux condenser, and a dropping funnel, and heated to 90° C. After 42.5 parts of glycidyl methacrylate was added dropwise over 2 hours, the mixture was stirred and aged for 1 hour. Thereafter, 59 parts of isopropanol was added, thereby obtaining a phosphate group containing polymerizable monomer solution having a solids content of 50%. The acid value of the obtained monomer was 285 mgKOH/g.

Production of Extender Pigment Dispersion

Production Example 5

327 parts (solids content: 180 parts) of the acrylic resin solution (R-2), 360 parts of deionized water, 6 parts of Surfynol 104A (trade name, produced by Air Products, antifoaming agent, solids content: 50%), and 250 parts of Barifine BF-20 (trade name, produced by Sakai Chemical Industry Co., Ltd., barium sulfate powder, average particle size: 0.03 μm) were placed in a paint conditioner, and a glass bead medium was added thereto. The mixture was mixed and dispersed at room temperature for 1 hour, thereby obtaining an extender pigment dispersion (P-1) having a solids content of 44%.

Production of Color Pigment Dispersion

Production Example 6

327 parts (solids content: 180 parts) of the acrylic resin solution (R-2), 500 parts of "Titanix JR-806" (trade name, produced by Tayca Corporation, titanium oxide), and 500 parts of deionized water were mixed. After the pH of the mixture was adjusted to 8.2 using 2-(dimethylamino)ethanol, the mixture was dispersed in a paint shaker for 30 minutes, thereby obtaining a color pigment dispersion (P-2) having a solids content of 51%.

Production of Color Pigment Dispersion

Production Example 7

22 parts (solids content: 12 parts) of the acrylic resin solution (R-2), 18 parts of "Perrindo Maroon 179 229-6438" (trade name, produced by SunChemical Corporation, organic perylene pigment), and 60 parts of deionized water were mixed. After the pH of the mixture was adjusted to 8.0 using 2-(dimethylamino)ethanol, the mixture was dispersed in a paint shaker for 30 minutes, thereby obtaining a color pigment dispersion (P-3) having a solids content of 31%.

Production of Color Pigment Dispersion

Production Example 8

18 parts (solids content: 10 parts) of the acrylic resin solution (R-2), 23 parts of "Bay Fast Yellow Y5688" (trade name, produced by Lanxes, nickel complex azo yellow pigment), and 59 parts of deionized water were mixed. After the pH of the mixture was adjusted to 8.0 using 2-(dimethylamino)ethanol, the mixture was dispersed in a paint shaker for 30 minutes, thereby obtaining a color pigment dispersion (P-4) having a solids content of 34%.

PRODUCTION OF BASE PAINT (X)

Production of Transparent Base Paint (X-1)

Production Example 9

In a stirring vessel, 14 parts (on a solids basis) of the extender pigment dispersion (P-1), 40 parts (on a solids basis) of the acrylic resin aqueous dispersion (R-1), 23 parts (on a solids basis) of the polyester resin solution (R-3), 10 parts (on a solids basis) of "U-COAT UX-310" (trade name, produced by Sanyo Chemical Industries, Ltd., urethane resin aqueous dispersion, solids content: 40%), and 27 parts (on a solids basis) of "Cymel 251" (trade name, produced by Nihon Cytec Industries Inc., melamine resin, solids content: 80%) were stirred and mixed, thereby preparing a transparent base paint (X-1).

Production of Colored Base Paint (X-2)

Production Example 10

In a stirring vessel, 23 parts (on a solids basis) of the color pigment dispersion (P-2), 40 parts (on a solids basis) of the acrylic resin aqueous dispersion (R-1), 23 parts (on a solids basis) of the polyester resin solution (R-3), 10 parts (on a solids basis) of "U-COAT UX-310" (trade name, produced by Sanyo Chemical Industries, Ltd., urethane resin aqueous dispersion, solids Content: 40%), and 27 parts (on a solids basis) of "Cymel 251" (trade name, produced by Nihon Cytec Industries Inc., melamine resin, solids content: 80%) were stirred and mixed, thereby preparing a colored base paint (X-2) (L* value: 90).

Production of Colored Base Paint (X-3)

Production Example 11

In a stirring vessel, 14 parts (on a solids basis) of the color pigment dispersion (P-3), 40 parts (on a solids basis) of the acrylic resin aqueous dispersion (R-1), 23 parts (on a solids basis) of the polyester resin solution (R-3), 10 parts (on a solids basis) of "U-COAT UX-310" (trade name, produced by Sanyo Chemical Industries, Ltd., urethane resin aqueous dispersion, solids content: 40%), 27 parts (on a solids basis) of "Cymel 251" (trade name, produced by Nihon Cytec Industries Inc., melamine resin, solids content: 80%) were stirred and mixed, thereby preparing a red colored base paint (X-3).

Production of Colored Base Paint (X-4)

Production Example 12

In a stirring vessel, 2 parts (on a solids basis) of the red color pigment dispersion (P-3), 10 parts (on a solids basis) of the yellow color pigment dispersion (P-4), 40 parts (on a solids basis) of the acrylic resin aqueous dispersion (R-1), 23 parts (on a solids basis) of the polyester resin solution (R-3), 10 parts (on a solids basis) of "U-COAT UX-310" (trade name, produced by Sanyo Chemical Industries, Ltd., urethane resin aqueous dispersion, solids content: 40%), and 27 parts (on a solids basis) of "Cymel 251" (trade name, produced by Nihon Cytec Industries Inc., melamine resin, solids content: 80%) were stirred and mixed, thereby preparing an orange colored base paint (X-4).

Production of Effect Pigment Dispersion (Y)

Production Example 13

In a stirring vessel, 82 parts of distilled water, 20 parts (solids content: 0.4 parts) of a rheology control agent (A-1), 3 parts (solids content: 3 parts) of a flake-effect pigment (B-1), 1 part (solids content: 1 part) of a surface adjusting agent (C-1), and 1 part (solids content: 0.9 parts) of "Cymel 327" (trade name, water-soluble melamine resin, solids content: 90%) were stirred and mixed, thereby preparing an effect pigment dispersion (Y-1).

The rheology control agent (A-1), the flake-effect pigment (B-1), and the surface adjusting agent (C-1) are as follows.
(A-1) "Rheocrysta" (trade name, produced by DKS Co. Ltd., cellulose nanofiber, solids content: 2%)
(B-1) "Xirallic T60-10 Crystal Silver" (trade name, titanium oxide-coated alumina flake pigment, produced by Merck & Co., Inc., primary average particle size: about 19 μm, thickness: about 0.4 μm)
(C-1) "BYK348" (trade name, produced by BYK, silicone-based, dynamic surface tension: 63.9 mN/m, static surface tension: 22.2 mN/m, lamellar length: 7.45 mm, contact angle (Note 1): 13°, solids content: 100%)
Note 1: A contact angle with respect to a tin plate 10 seconds after application of a liquid mixture prepared by mixing isopropanol, water, and the surface adjusting agent (C) at a mass ratio of 4.5/95/1, and being adjusted to have a viscosity of 150 mPa·s measured by a Brookfield type viscometer at a rotor rotational speed of 60 rpm at a temperature of 20° C.

Production Examples 14 to 28

Effect pigment dispersions (Y-2) to (Y-34) were obtained in the same manner as in Production Example 13, except that the formulations shown in Table 1 were used.

The following are components shown in Table 1.
(A-2): "Acrysol ASE-60" (trade name, produced by Dow Chemical Co., Ltd., polyacrylic acid-based rheology control agent, solids content: 28%)
(B-2): "Xirallic T61-10 Micro Silver" (tradename, titanium oxide-coated alumina flake pigment, produced by Merck & Co., Inc., primary average particle size: about 12 μm, average thickness: about 0.3 μm)
(B-3): "TWINCLE PEARL SXC-SO" (trade name, produced by Nihon Koken Kogyo Co., Ltd., titanium oxide-coated artificial mica pigment, primary average particle size: about 16 μm, average thickness: about 0.4 μm)
(B-4): "Iriodin 121 RUTILE LUSTRE SATIN" (trade name, produced by Merck & Co., Inc., titanium oxide-coated mica pigment, primary average particle size: about 10 μm, average thickness: about 0.4 μm)
(B-5): "Colorstream (registered trademark) F20-51 SW Lava Red" (trade name, iron oxide-coated silica pigment, produced by Merck & Co., Inc., primary average particle size: about 21.4 μm, average thickness: 0.73 μm)
(B-6): "Xirallic (registered trademark) T60-21 SW Solaris Red" (trade name, titanium oxide-coated alumina flake pigment, produced by Merck & Co., Inc., primary average particle size: about 19.2 μm, average thickness: about 0.59 μm)
(B-7): "Xirallic (registered trademark) T60-23 SW GalaxyBlue" (trade name, titanium oxide-coated alumina flake pigment, produced by Merck & Co., Inc., primary average particle size: about 19.4 μm, average thickness: 0.64 μm)
(B-8): "Pyrisma (registered trademark) M40-58 SW Ambercup Orange" (trade name, iron oxide-coated mica pigment, produced by Merck & Co., Inc., primary average particle size: about 17.1 μm, average thickness: about 0.65 μm)
"Diyanal HR517" (trade name, produced by Mitsubishi Rayon Co., Ltd., acrylic resin containing N-butoxymethylacrylamide as a polymerizable component, solids content: 50%)

TABLE 1

| | Production Example No. | | | 13 | 14 | 15 | 16 | 17 | 18 | 19 | 20 |
|---|---|---|---|---|---|---|---|---|---|---|---|
| | Name of effect pigment dispersion | | | Y-1 | Y-2 | Y-3 | Y-4 | Y-5 | Y-6 | Y-7 | Y-8 |
| Formulation | Distilled water | | | 82 | 1300 | 65 | 100 | 82 | 82 | 82 | 82 |
| | Rheology control agent (A) | A-1 | Rheocrysta | 2 | 100 | 20 | | 20 | 20 | 20 | 20 |
| | | A-2 | ASE-60 | | | | 1.7 | | | | |
| | Flake-effect pigment (B) | B-1 | Xirallic T60-10 | 3 | 3 | 6 | 3 | 1.5 | 3 | | |
| | | B-2 | Xirallic T61-10 | | | | | | | 2.7 | |
| | | B-3 | Twincle Pearl SXC-SO | | | | | | | | 2.7 |
| | | B-4 | Iriodin 121 | | | | | | | | |
| | Surface adjusting agent (C) | C-1 | BYK348 | 1 | 1 | 1 | 1 | 1 | | 1 | 1 |
| | Dimethylethanolamine | | | | | | | | 0.1 | | |
| | Isopropyl alcohol | | | | | | | | | 5 | |
| | Acrylic resin aqueous dispersion | R-1 | Production Example 1 | | | | | | | | |
| | Water-soluble melamine resin | | Cyrnel 327 | 1 | 1 | 2 | 1 | 2 | | 1 | 1 |
| | Phosphate group-containing acrylic resin | R-4 | Production Example 4 | | | | | | | | |
| Performance | Solids content of effect pigment dispersion (Y) (%) | | | 5.0 | 0.5 | 9.8 | 5.1 | 4.4 | 3.1 | 4.7 | 4.7 |
| | Paint viscosity B60 value/mPa·s | | | 300 | 100 | 550 | 150 | 300 | 280 | 300 | 300 |
| | Amount of effect pigment (B) (parts by mass) per 100 parts by mass of effect pigment dispersion (Y) | | | 57 | 43 | 65 | 56 | 32 | 88 | 54 | 54 |

| | Production Example No. | | | 21 | 22 | 23 | 24 | 25 | 26 | 27 | 28 |
|---|---|---|---|---|---|---|---|---|---|---|---|
| | Name of effect pigment dispersion (Y) | | | Y-9 | Y-10 | Y-11 | Y-12 | Y-13 | Y-14 | Y-15 | Y-16 |
| Formulation | Distilled water | | | 82 | 82 | 82 | 82 | 2800 | 56 | 82 | 82 |
| | Rheology control agent (A) | A-1 | Rheocrysta | 20 | 20 | 20 | 20 | 100 | 20 | 20 | 20 |
| | | A-2 | ASE-60 | | | | | | | | |
| | Flake-effect pigment (B) | B-1 | Xirallic T60-10 | | | 3 | 3 | 3 | 3 | 9 | 1 | 5 |
| | | B-2 | Xirallic T61-10 | | | | | | | | |
| | | B-3 | Twincle Pearl SXC-SO | | | | | | | | |
| | | B-4 | Iriolin 121 | 2.7 | | | | | | | |

TABLE 1-continued

| | | | | | | | | | | | |
|---|---|---|---|---|---|---|---|---|---|---|---|
| | Surface adjusting agent (C) | C-1 | BYK348 | 1 | | 1 | 1 | 1 | 1 | 1 | |
| | Dimethylethanolamine | | | | | | | 0.1 | | | |
| | Isopropyl alcohol | | | | 5 | | | | | | 5 |
| | Acrylic resin aqueous dispersion | R-1 | Production Example 1 | | | 3.3 | | | | | |
| | Water-soluble melamine resin | | Cymel 327 | 1 | 1 | | | 1 | 3 | 2 | |
| | Phosphate group-containing acrylic resin | R-4 | 1 Production Example 4 | | | | 1.8 | | | | |
| Performance | Solids content of effect pigment dispersion (Y) (%) | | | 4.7 | 3.9 | 4.9 | 4.9 | 0.2 | 14.7 | 4.0 | 4.8 |
| | Paint viscosity B60 value/mPa · s | | | 300 | 280 | 300 | 320 | 40 | 860 | 300 | 280 |
| | Amount of effect pigment (B) (parts by mass) per 100 parts bypass of effect pigment dispersion (Y) | | | 54 | 70 | 56 | 57 | 43 | 69 | 24 | 93 |

| | Production Example No. | | | 29 | 30 | 31 | 32 | 33 | 34 |
|---|---|---|---|---|---|---|---|---|---|
| | Name of effect pigment dispersion (Y) | | | Y-17 | Y-18 | Y-19 | Y-20 | Y-21 | Y-22 |
| Formulation | Distilled water | | | 82 | 82 | 82 | 82 | 82 | 82 |
| | Rheology control agent (A) | A-1 | Rheocrysta | 20 | 20 | 20 | 20 | 20 | 20 |
| | | A-2 | ASE-60 | | | | | | |
| | Flake-effect pigment (B) | B-1 | Xirallic T60-10 | 3 | | | | | |
| | | B-2 | Xirallic T61-10 | | | | | | |
| | | B-3 | Twincle Pearl SXC-SO | | | | | | |
| | | B-4 | Iriodin 121 | | | | | | |
| | | B-5 | Colorstream F20-51 | | 3 | | | 3 | |
| | | B-6 | Xirallic T60-21 | | | 3 | | | |
| | | B-7 | Xirallic T60-23 | | | | 3 | | |
| | | B-8 | Pyrisma M40-58 | | | | | | 3 |
| | Surface adjusting agent (C) | C-1 | BYK348 | 1 | 1 | 1 | 1 | 1 | 1 |
| | Dimethylethanolamine isopropyl alcohol | | | | | | | | |
| | Color pigment dispersion | P-3 | | | | | | 4 | |
| | Acrylic resin aqueous dispersion | R-1 | Production Example 1 | | | | | | |
| | Water-soluble melamine resin | | Cymel 327 | 1 | 1 | 1 | 1 | 1 | 1 |
| | Phosphate group-containing acrylic resin | R-4 | Production Example 4 | | | | | | |
| | N-butoxyacrylamie-containing acrylic resin | | Diyanal HR-517 | 6 | | | | | |
| Performance | Solids content of effect pigment dispersion (Y) (%) | | | 7.4 | 5.0 | 5.0 | 5.0 | 6.0 | 5.0 |
| | Paint viscosity B60 value/mPa · s | | | 300 | 300 | 300 | 300 | 300 | 300 |
| | Amount of effect pigment (B) (parts by mass) per 100 parts la mass of effect pigment dispersion (Y) | | | 36 | 57 | 57 | 57 | 45 | 57 |

Preparation of Clear Paint (Z)

Clear Paint (Z-1)

"KINO6510" (trade name, produced by Kansai Paint Co., Ltd., hydroxy/isocyanate curable acrylic resin/urethane resin-based two-component organic solvent-based paint) was used as a clear paint (Z-1).

Clear Paint (Z-2)

"KINO1210" (trade name; Kansai Paint Co., Ltd., acid/epoxy curable acrylic resin-based one-component organic solvent-based paint) was used as a clear paint (Z-2).

Clear Paint (Z-3)

"Magicron TC-71" (trade name: Kansai Paint Co., Ltd., acryl and melamine resin-based one-component organic solvent-based paint) was used as a clear paint (Z-3).

Clear Paint (Z-4)

A paint obtained by adding, to the clear paint (Z-1), 1.1 parts of "Perrindo Maroon 179 229-6438" (trade name, produced by SunChemical Corporation, organic perylene pigment), per 100 parts by mass of the resin solids content of the clear paint (Z-1), was used as a clear paint (Z-4).

Preparation of Colored Paint (W)

Colored Paint (W-1)

"TP-65" (trade name, produced by Kansai Paint Co., Ltd., polyester resin-based solvent-based intermediate paint, L* value of the coating film to be obtained: 85) was used as a colored paint (W-1).

Colored Paint (W-2)

"TP-65" (trade name, produced by Kansai Paint Co., Ltd., polyester resin-based solvent-based intermediate paint, L* value of the coating film to be obtained: 70) was used as a colored paint (W-2).

Colored Paint (W-3)

"TP-65 No. 7318" (trade name, produced by Kansai Paint Co., Ltd., solvent-based red intermediate paint) was used as a colored paint (W-3).

Preparation of Substrate

A cationic electrodeposition paint "Elecron 9400HB" (trade name, produced by Kansai Paint Co., Ltd., an amine-modified epoxy resin-based cationic resin containing a blocked polyisocyanate compound as a curing agent) was applied by electrodeposition to a degreased and zinc phosphate-treated steel plate (JISG3141, size: 400×300×0.8 mm) to a film thickness of 20 μm when cured. The resulting film was heated at 170° C. for 20 minutes to be cured by crosslinking, thereby obtaining a substrate 1.

PRODUCTION OF TEST PLATE

Example 1

Step (1): The colored paint (W-1) was applied to the substrate 1 to a cured film thickness of 35 μm by electrostatic spraying using a rotary atomization-type bell-shaped coating device, and the resulting film was heated at 140° C. for 30 minutes to be cured by crosslinking.

Step (2): Subsequently, the transparent base paint (X-1) was applied to the cured coating film to a cured film thickness of 10 μm by electrostatic spraying using a rotary atomization-type bell-shaped coating device, and the resulting film was allowed to stand for 2 minutes.

Step (3) Subsequently, the effect pigment dispersion (Y-1) was adjusted to have a paint viscosity shown in Table 1 and applied to the coating film using a robot bell (produced by ABB) under the conditions in which the booth temperature was 23° C. and the humidity was 68%, so that the dry film thickness of the effect pigment dispersion (Y-1) was 0.8 μm after step (5). The resultant was then allowed to stand at 80° C. for 3 minutes.

Step (4): Subsequently, the clear paint (Z-1) was applied to the dry coating film surface using a robot bell (produced by ABB) under the conditions in which the booth temperature was 23° C. and the humidity was 68%, so that the dry film thickness of the clear paint (Z-1) was 25 to 35 μm after step (5).

Step (5): After coating, the resultant was allowed to stand at room temperature for 7 minutes, and then heated in a hot air circulation-type dryer at 140° C. for 30 minutes to simultaneously dry the multilayer coating films, thereby obtaining a test plate.

The dry film thickness of the effect coating film shown in Table 2 was calculated from the following formula (2). The same applies to the following Examples.

$$x=(sc*10000)/(S*sg) \quad (2)$$

x: film thickness [μm]
sc: coating solids content [g]
S: evaluation area of coating solids content [cm$^2$]
sg: coating film specific gravity [g/cm$^3$]

Examples 2 to 21 and 28 to 34 and Comparative Examples 1 to 3, 5, and 6

Test plates were obtained in the same manner as in Example 1, except that the base paint (X), dispersion (Y), clear paint (Z), and dry film thickness of the effect coating film shown in Table 2 were used.

Example 22

Step (1): The colored paint (W-1) was applied to the substrate 1 to a cured film thickness of 35 μm by electrostatic spraying using a rotary atomization-type bell-shaped coating device, and the resulting film was heated at 140° C. for 30 minutes to be cured by crosslinking.

Subsequently, the colored paint (W-3) was applied to the cured coating film to a cured film thickness of 35 μm by electrostatic spraying using a rotary atomization-type bell-shaped coating device, and the resulting film was heated at 140° C. for 30 minutes to be cured by crosslinking.

Step (2): Subsequently, the transparent base paint (X-1) was applied to the cured coating film to a cured film thickness of 10 μm by electrostatic spraying using a rotary atomization-type bell-shaped coating device, and the resulting film was allowed to stand for 2 minutes.

Step (3): Further, the effect pigment dispersion (Y-1) was adjusted to have a paint viscosity shown in Table 1, and applied to the coating film using a robot bell (produced by ABB) under the conditions in which the booth temperature was 23° C. and the humidity was 68%, so that the dry film thickness was 0.8 μm after step (5). The resultant was then allowed to stand at 80° C. for 3 minutes.

Step (4): Subsequently, the clear paint (Z-1) was applied to the dry coating film surface using a robot bell (produced by ABB) under the conditions in which the booth temperature was 23° C. and the humidity was 68%, so that the dry film thickness of the clear paint (Z-1) was 25 to 35 μm after step (5).

Step (5) After coating, the resultant was allowed to stand at room temperature for 7 minutes, and then heated in a hot air circulation-type dryer at 140° C. for 30 minutes to simultaneously dry the multilayer coating films, thereby obtaining a test plate.

Examples 23 to 27

Test plates were obtained in the same manner as in Example 22, except that the colored paint (W), base paint (X), dispersion (Y), clear paint (Z), and dry film thickness of the effect coating film shown in Table 2 were used.

Example 35

Step (1): The colored paint (W-1) was applied to the substrate 1 to a cured film thickness of 35 μm by electrostatic spraying using a rotary atomization-type bell-shaped coating device, and the resulting film was heated at 140° C. for 30 minutes to be cured by crosslinking.

Step (2): Subsequently, the transparent base paint (X-1) was applied to the cured coating film to a cured film thickness of 10 μm by electrostatic spraying using a rotary atomization-type bell-shaped coating device, and the resulting film was allowed to stand for 2 minutes.

Step (3): Further, the effect pigment dispersion (Y-1) was adjusted to have a paint viscosity shown in Table 1, and applied to the coating film using a robot bell (produced by ABB) under the conditions in which the booth temperature was 23° C. and the humidity was 68%, so that the dry film thickness of the effect pigment dispersion (Y-1) was 0.8 μm after step (5). The resultant was then allowed to stand at 80° C. for 3 minutes.

Step (4) Subsequently, the clear paint (Z-1) was applied to the dry coating film surface using a robot bell (produced by ABB) under the conditions in which the booth temperature was 23° C. and the humidity was 68%, so that the dry film thickness of the clear paint (Z-1) was 25 to 35 μm after step (5).

After coating, the resultant was allowed to stand at room temperature for 7 minutes, and then heated in a hot air circulation-type dryer at 140° C. for 30 minutes to simultaneously dry the multilayer coating films.

Subsequently, the red colored base paint (X-3) was applied to the dry coating film to a cured film thickness of 10 μm by electrostatic spraying using a rotary atomization-type bell-shaped coating device, and the resulting film was allowed to stand at 80° C. for 3 minutes.

Subsequently, the clear paint (Z-1) was applied thereto using a robot bell (produced by ABB) under the conditions in which the booth temperature was 23° C. and the humidity was 68%, so that the dry film thickness of the clear paint (Z-1) was 25 to 35 μm after step (5).

Step (5): After coating, the resultant was allowed to stand at room temperature for 7 minutes, and then heated in a hot air circulation-type dryer at 140° C. for 30 minutes to simultaneously dry the multilayer coating films, thereby obtaining a test plate.

Example 36

Step (1): The colored paint (W-1) was applied to the substrate 1 to a cured film thickness of 35 μm by electrostatic spraying using a rotary atomization-type bell-shaped coating device, and the resulting film was heated at 140° C. for 30 minutes to be cured by crosslinking. Subsequently, the coating film was polished with sandpaper #2000, and the surface was wiped off with gasoline.

Step (2): Subsequently, the transparent base paint (X-1) was applied to the cured coating film to a cured film thickness of 10 μm by electrostatic spraying using a rotary atomization-type bell-shaped coating device, and the resulting film was allowed to stand for 2 minutes.

Step (3): Subsequently, the effect pigment dispersion (Y-1) was adjusted to have a paint viscosity shown in Table 1 and applied to the coating film using a robot bell (produced by ABB) under the conditions in which the booth temperature was 23° C. and the humidity was 68%, so that the dry film thickness of the effect pigment dispersion (Y-1) was 0.5 μm after step (5). The resultant was then allowed to stand at 80° C. for 3 minutes.

Step (4) Subsequently, the clear paint (Z-1) was applied to the dry coating film surface using a robot bell (produced by ABB) under the conditions in which the booth temperature was 23° C. and the humidity was 68%, so that the dry film thickness of the clear paint (Z-1) was 25 to 35 μm after step (5).

Step (5): After coating, the resultant was allowed to stand at room temperature for 7 minutes, and then heated in a hot air circulation-type dryer at 140° C. for 30 minutes to simultaneously dry the multilayer coating films, thereby obtaining a test plate.

Comparative Example 4

Step (1): The colored paint (W-1) was applied to the substrate 1 to a cured film thickness of 35 μm by electrostatic spraying using a rotary atomization-type bell-shaped coating device, and the resulting film was allowed to stand at room temperature for 15 minutes.

Step (2): Subsequently, the transparent base paint (X-1) was applied to the cured coating film to a cured film thickness of 10 μm by electrostatic spraying using a rotary atomization-type bell-shaped coating device, and the resulting film was allowed to stand for 2 minutes.

Step (3): Subsequently, the effect pigment dispersion (Y-1) was adjusted to have a paint viscosity shown in Table 1 and applied to the coating film using a robot bell (produced by ABB) under the conditions in which the booth temperature was 23° C. and the humidity was 68%, so that the dry film thickness was 0.8 μm after step (5). The resultant was then allowed to stand at 80° C. for 3 minutes.

Step (4): Subsequently, the clear paint (Z-1) was applied to the dry coating film surface using a robot bell (produced by ABB) under the conditions in which the booth temperature was 23° C. and the humidity was 68%, so that the dry film thickness of the clear paint (Z-1) was 25 to 35 μm after step (5).

Step (5): After coating, the resultant was allowed to stand at room temperature for 7 minutes, and then heated in a hot air circulation-type dryer at 140° C. for 30 minutes to simultaneously dry the multilayer coating films, thereby obtaining a test plate.

Evaluation of Coating Film

The appearance and performance of the coating film of each test plate obtained in the above manner were evaluated. Table 2 shows the results.

Evaluation of Appearance

The coating film appearance and performance were evaluated by luminance (Y5 value), graininess (HG value), anti-water adhesion, and undercoat hiding power.

Graininess

The graininess was evaluated as a hi-light graininess value (hereinafter abbreviated as the "HG value"). The HG value is a parameter of microscopic brilliance obtained by the microscopic observation of a coating surface, and indicates the graininess in the highlight. The HG value is calculated as follows. First, the coating surface is photographed with a CCD camera at a light incidence angle of 15° and a receiving angle of 0°, and the obtained digital image data (two-dimensional brilliance distribution data) is subjected to two-dimensional Fourier transformation to obtain a power spectrum image. Subsequently, only the spatial frequency area corresponding to graininess is extracted from the power spectrum image, and the obtained measurement parameter is converted to a numerical value from 0 to 100 that has a linear relation with graininess, thus obtaining an HG value. An HG value of 0 indicates no graininess of the effect pigment at all, and an HG value of 100 indicates the highest possible graininess of the effect pigment.

The graininess HG is preferably 20 to 65, in teams of the denseness of pearl luster.

Luminance

A luminance value (Y5) in the XYZ color space was calculated based on a spectral reflectance of light illuminated at an angle of 45° with respect to a coating film and received at an angle of 5° in the incident light direction with respect to the specular reflection light. The measurement and the calculation were performed using Gonio meter GCMS-4 (trade name, Murakami Color Research Laboratory, Co., Ltd.).

The Y5 value is preferably 400 to 1000, in terms of pearl luster.

Anti-Water Adhesion

Each test plate of Examples 1 to 36 and Comparative Examples 1 to 6 was immersed in warm water at 80° C. for 5 hours. Immediately after the test plate was removed from the water, cross-cuts reaching the substrate were made in the multilayer coating film of the test plate using a cutter knife to form a grid of 100 squares (2 mm×2 mm). Subsequently, adhesive cellophane tape was applied to the surface of the grid portion, and the tape was peeled off rapidly at 20° C. Then, the condition of squares remaining was checked, and anti-water adhesion was evaluated according to the following criteria.

Pass: 100 squares of the coating film remained, and no small edge peeling of the coating film occurred at the edge of the cut made by the cutter knife.

Fail: The remaining number of squares of the coating film was 99 or less.

Undercoat Hiding Power

In Examples 1 to 35 and Comparative Examples 1 to 3, 5, and 6, a colored coating film was formed using the colored paint (W-1) in step (1), and the coating film surface was polished with sandpaper #2000 and wiped off with gasoline, followed by obtaining a multilayer coating film by performing step (2) and the subsequent steps. The obtained multilayer coating film was visually observed to evaluate undercoat hiding power according to the following criteria. The test plate of Example 36 was directly subjected to the test for undercoat hiding power.

Pass: No gouge marks were observed.

Fail: Gouge marks were observed.

The multilayer coating film of the test plate of Comparative Example 3 showed no undercoat hiding power, and was inappropriate as the multilayer coating film of the present invention.

TABLE 2

| | Example | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Name of substrate | 1 | 1 | 1 | 1 | 1 | 1 | 1 | 1 | 1 | 1 | 1 | 1 | 1 | 1 |
| Between substrate and colored paint | None | None | None | None | None | None | None | None | None | None | None | None | None | None |
| Name of colored paint (W) | W-1 | W-1 | W-1 | W-1 | W-1 | W-1 | W-1 | W-1 | W-1 | W-1 | W-1 | W-1 | W-1 | W-1 |
| Heating after application of colored paint (W) | Yes | Yes | Yes | Yes | Yes | Yes | Yes | Yes | Yes | Yes | Yes | Yes | Yes | Yes |
| Polishing | No | No | No | No | No | No | No | No | No | No | No | No | No | No |
| Name of base paint (X) | X-1 | X-1 | X-1 | X-1 | X-1 | X-1 | X-1 | X-1 | X-1 | X-1 | X-1 | X-1 | X-1 | X-1 |
| Name of effect pigment dispersion (Y) | Y-1 | Y-2 | Y-3 | Y-4 | Y-5 | Y-6 | Y-7 | Y-8 | Y-9 | Y-10 | Y-11 | Y-12 | Y-17 | Y-18 |
| Name of clear paint (Z) | Z-1 | Z-1 | Z-1 | Z-1 | Z-1 | Z-1 | Z-1 | Z-1 | Z-1 | Z-1 | Z-1 | Z-1 | Z-1 | Z-1 |
| Dry film thickness (μm) of effect coating film | 0.8 | 0.8 | 0.8 | 0.8 | 0.8 | 0.8 | 0.8 | 0.8 | 0.8 | 0.8 | 0.8 | 0.8 | 0.8 | 0.8 |
| Coating film performance — Graininess (HG, microscopic brilliance) | 55 | 65 | 61 | 65 | 60 | 56 | 38 | 50 | 48 | 56 | 55 | 54 | 57 | 50 |
| Y5 value | 720 | 580 | 550 | 500 | 590 | 750 | 600 | 650 | 590 | 720 | 700 | 730 | 710 | 212 |
| Anti-water adhesion (80° C. × 5 h) | Pass | Pass | Pass | Pass | Pass | Pass | Pass | Pass | Pass | Pass | Pass | Pass | Pass | Pass |
| Undercoat hiding power | Pass | Pass | Pass | Pass | Pass | Pass | Pass | Pass | Pass | Pass | Pass | Pass | Pass | Pass |

| | Example | | | | | | | | | | | | | |
|---|---|---|---|---|---|---|---|---|---|---|---|---|---|---|
| | 15 | 16 | 17 | 18 | 19 | 20 | 21 | 22 | 23 | 24 | 25 | 26 | 27 | 28 |
| Name of substrate | 1 | 1 | 1 | 1 | 1 | 1 | 1 | 1 | 1 | 1 | 1 | 1 | 1 | 1 |
| Between substrate and colored paint | None | None | None | None | None | None | None | W-1 | W-1 | W-1 | W-1 | W-1 | W-1 | None |
| Name of colored paint (N) | W-1 | W-1 | W-1 | W-1 | W-1 | W-1 | W-1 | W-3 | W-3 | W-3 | W-3 | W-3 | W-3 | W-1 |
| Heating after application of colored paint (W) | Yes | Yes | Yes | Yes | Yes | Yes | Yes | Yes | Yes | Yes | Yes | Yes | Yes | Yes |
| Polishing | No | No | No | No | No | No | No | No | No | No | No | No | No | No |
| Name of base paint (X) | X-1 | X-1 | X-1 | X-1 | X-3 | X-4 | X-3 | X-3 | X-1 | X-1 | X-3 | X-3 | X-3 | X-1 |
| Name of effect pigment dispersion (Y) | Y-19 | Y-20 | Y-21 | Y-1 | Y-18 | Y-22 | Y-21 | Y-1 | Y-18 | Y-21 | Y-1 | Y-18 | Y-21 | Y-7 |
| Name of clear paint(Z) | Z-1 | Z-1 | Z-1 | Z-1 | Z-1 | Z-1 | Z-1 | Z-1 | Z-1 | Z-1 | Z-1 | Z-1 | Z-1 | Z-1 |
| Dry film thickness (μm) of effect coat film | 0.8 | 0.8 | 0.8 | 0.8 | 0.8 | 0.8 | 0.8 | 0.8 | 0.8 | 0.8 | 0.8 | 0.8 | 0.8 | 5 |
| Coating film performance — Graininess (HG, microscopic brilliance) | 45 | 48 | 53 | 59 | 49 | 83 | 45 | 59 | 48 | 46 | 57 | 49 | 48 | 40 |
| Y5 value | 328 | 217 | 202 | 697 | 184 | 170 | 173 | 698 | 187 | 178 | 684 | 186 | 176 | 550 |
| Anti-water adhesion (80° C. × 5 h) | Pass | Pass | Pass | Pass | Pass | Pass | Pass | Pass | Pass | Pass | Pass | Pass | Pass | Pass |
| Undercoat hiding power | Pass | Pass | Pass | Pass | Pass | Pass | Pass | Pass | Pass | Pass | Pass | Pass | Pass | Pass |

| | Example | | | | | | | | Comparative Example | | | | | |
|---|---|---|---|---|---|---|---|---|---|---|---|---|---|---|
| | 29 | 30 | 31 | 32 | 33 | 34 | 35 | 36 | 1 | 2 | 3 | 4 | 5 | 6 |
| Name of substrate | 1 | 1 | 1 | 1 | 1 | 1 | 1 | 1 | 1 | 1 | 1 | 1 | 1 | 1 |
| Between substrate and colored paint | None | None | None | None | None | None | None | None | None | None | None | None | None | None |
| Name of colored paint (W) | W-1 | W-2 | W-1 | W-1 | W-1 | W-1 | W-1 | W-1 | W-1 | W-1 | W-1 | W-1 | W-1 | W-1 |
| Heating after application of colored paint (W) | Yes | Yes | Yes | Yes | Yes | Yes | Yes | Yes | Yes | Yes | Yes | No | Yes | Yes |
| Polishing | No | No | No | No | No | No | No | Yes | No | No | No | No | No | No |
| Name of base paint (X) | X-1 | X-1 | X-2 | X-1 | X-1 | X-1 | X-1 | X-1 | X-1 | X-1 | — | X-1 | X-1 | X-1 |
| Name of effect pigment dispersion | Y-7 | Y-1 | Y-1 | Y-1 | Y-1 | Y-1 | Y-1 | Y-1 | Y-13 | Y-14 | Y-1 | Y-1 | Y-15 | Y-16 |
| Name of clear paint (Z) | Z-1 | Z-1 | Z-1 | Z-2 | Z-3 | Z-4 | Z-1 | Z-1 | Z-1 | Z-1 | Z-1 | Z-1 | Z-1 | Z-1 |
| Dry film thickness (μm) of effect coating film | 0.2 | 0.8 | 0.8 | 0.8 | 0.8 | 0.8 | 0.8 | 0.5 | 0.8 | 0.8 | 0.8 | 0.8 | 0.8 | 0.8 |
| coating cm performance — Graininess (HG, microscopic brilliance) | 47 | 58 | 54 | 55 | 55 | 48 | 48 | 55 | 68 | 60 | 52 | 66 | 66 | 56 |
| Y5 value | 400 | 700 | 740 | 720 | 720 | 65 | 65 | 720 | 380 | 380 | 790 | 370 | 440 | 770 |
| Anti-water adhesion (80° C. × 5 h) | Pass | Pass | Pass | Pass | Pass | Pass | Pass | Pass | Pass | Pass | Pass | Pass | Pass | Fail |
| Undercoat hiding power | Pass | Pass | Pass | Pass | Pass | Pass | Pass | Pass | Pass | Pass | Fail | — | Pass | Pass |

The embodiments and Examples of the present invention are described in detail above. However, the present invention is not limited to the above-mentioned embodiments, and various modifications can be made based on the technical idea of the present invention.

The invention claimed is:

1. A method for forming a multilayer coating film by sequentially performing the following steps (1) to (5):
   (1) applying a colored paint (W) to a substrate having a cationic or an anionic electrodeposition paint (E) applied thereon, followed by heating, to form a colored coating film,
   (2) applying a base paint (X) to the colored coating film formed in step (1) to form a base coating film, the base paint (X) containing a base resin selected from the group consisting of an acrylic resin, a polyester resin, and an epoxy resin,
   (3) applying an effect pigment dispersion (Y) to the base coating film formed in step (2) to form an effect coating film,
   (4) applying a clear paint (Z) to the effect coating film formed in step (3) to form a clear coating film, and
   (5) heating the uncured base coating film, the uncured effect coating film, and the uncured clear coating film formed in steps (2) to (4) to thereby simultaneously cure these three coating films;

wherein the effect pigment dispersion (Y) contains water, a rheology control agent (A), and a flake-effect pigment (B), and has a solids content of 0.5 to 10 mass %, wherein the flake-effect pigment (B) is an interference pigment in which a transparent or translucent base material is coated with a metal oxide, wherein the flake-effect pigment (B) is contained in an amount of 30 to 90 parts by mass based on 100 parts by mass of the total solids content in the effect pigment dispersion, and wherein the effect coating film has a dry film thickness of 0.2 to 3 µm.

2. The method for forming a multilayer coating film according to claim 1, wherein the multilayer coating film obtained in step (5) has a Y value (Y5) of 400 to 1000 and an HG value of 20 to 65, wherein the Y value expresses luminance in the XYZ color space based on the spectral reflectance of light illuminated at an angle of 45 degrees with respect to the coating film and received at an angle of 5 degrees deviated from the specular reflection light in the incident light direction, and the HG value expresses microscopic brilliance.

3. The method for forming a multilayer coating film according to claim 1, wherein the base coating film is a transparent coating film or a colored coating film.

4. The method for forming a multilayer coating film according to claim 1, wherein the colored coating film obtained in step (1) has an L* value of 60 or more.

5. The method for forming a multilayer coating film according to claim 1, wherein the rheology control agent (A) is a cellulose nanofiber.

6. The method for forming a multilayer coating film according to claim 1, wherein the effect pigment dispersion (Y) further contains a surface adjusting agent (C), and wherein the surface adjusting agent (C) has a contact angle of 8 to 20° with respect to a previously degreased tin plate, the contact angle being measured in such a manner that a liquid that is a mixture of isopropanol, water, and the surface adjusting agent (C) at a ratio of 4.5/95/1 is adjusted to have a viscosity of 150 mPa s measured with a Brookfield-type viscometer at a rotor rotational speed of 60 rpm at a temperature of 20° C., 10 µL of the liquid is added dropwise to the tin plate, and the contact angle with respect to the tin plate is measured 10 seconds after dropping.

7. The method for forming a multilayer coating film according to claim 1, wherein the clear paint (Z) is a two-component clear paint containing a hydroxy-containing resin and a polyisocyanate compound.

* * * * *